US007630637B2

(12) United States Patent
Mizutani et al.

(10) Patent No.: US 7,630,637 B2
(45) Date of Patent: Dec. 8, 2009

(54) PON SYSTEM AND OPTICAL NETWORK UNIT

(75) Inventors: Masahiko Mizutani, Kokubunji (JP); Takeshi Shibata, Yokohama (JP); Tohru Kazawa, Kokubunji (JP); Yoshihiro Ashi, Yokohama (JP); Masanobu Kobayashi, Yokohama (JP); Masayuki Takase, Kokubunji (JP)

(73) Assignee: Hitachi Communication Technologies, Ltd., Tokyo (JP)

( * ) Notice: Subject to any disclaimer, the term of this patent is extended or adjusted under 35 U.S.C. 154(b) by 653 days.

(21) Appl. No.: 11/503,246

(22) Filed: Aug. 14, 2006

(65) Prior Publication Data

US 2007/0264017 A1 Nov. 15, 2007

(30) Foreign Application Priority Data

May 10, 2006 (JP) ............................. 2006-131180

(51) Int. Cl.
*H04J 14/00* (2006.01)
(52) U.S. Cl. ............................. 398/67; 398/58; 398/68; 398/72
(58) Field of Classification Search .................. 398/58, 398/59, 63, 66–68, 70–72
See application file for complete search history.

(56) References Cited

U.S. PATENT DOCUMENTS

| 5,757,798 | A | 5/1998 | Hamaguchi |
| 6,950,431 | B1 | 9/2005 | Nozaki et al. |
| 7,480,295 | B2 * | 1/2009 | Sung et al. ................. 370/390 |
| 2004/0033075 | A1 * | 2/2004 | Koch et al. ................. 398/58 |
| 2006/0072572 | A1 | 4/2006 | Ikeda et al. |
| 2006/0127091 | A1 * | 6/2006 | Yoo et al. ................. 398/69 |

FOREIGN PATENT DOCUMENTS

| JP | 2001/111591 | 4/2001 |
| JP | 2006/109047 | 4/2006 |

OTHER PUBLICATIONS

ITU-T Recommendation (G.984.1, Mar. 2003. International Telecommunication Union, Gigabit-capable Passive Optical Networks (GPON): General Characteristics.
ITU-T Recommendation G.984.2, Mar. 2003. International Telecommunication Union, "Gigabit-capable Passive Optical Networks (GPON): Physical Media Dependent (PMD) layer specification".
"ITU-T Recommendation G.984.3, Mar. 2003. International Telecommunication Union,"Gigabit-capable Passive Opitcal Networks (G-PON): Transmission convergence layer specification.

* cited by examiner

*Primary Examiner*—Dalzid Singh
(74) *Attorney, Agent, or Firm*—Mattingly & Malur, P.C.

(57) ABSTRACT

Provided is an ONU that suppresses transmission of a useless multicast control message to a PON section and enables a communication bandwidth of the PON section to be effectively used. The ONU of the PON system has a multicast group management table that shows a correspondence between a multicast group identifier and an address of a user terminal participating in a multicast group. When the ONU receives a request message of participation in the multicast group from the user terminal, the ONU registers the correspondence between the multicast group identifier indicated by the received message and the user terminal address. A new received message is deleted without being sent to the OLT if another user terminal address is registered already, along with a correspondence with the same multicast group identifier, in the multicast group management table.

6 Claims, 18 Drawing Sheets

GTC DOWNSTREAM FRAME 80

FIG. 6

ROUTING TABLE 240

| DMAC | LINE NUMBER |
|---|---|
| MAC11 | L11 |
| MAC12 | L11 |
| ⋮ | ⋮ |

FIG. 7

ARP TABLE 250

| IP ADDRESS | MAC ADDRESS |
|---|---|
| IP111 | MAC111 |
| IP112 | MAC112 |
| ⋮ | ⋮ |

FIG. 8

MULTICAST GROUP MANAGEMENT TABLE 260

| IP MULTICAST GROUP ADDRESS 261 | PARTICIPANT USER'S IP ADDRESS 262 | VID 263 | TIME LIMIT 264 | REPORT FLAG 265 |
|---|---|---|---|---|
| GIP1 | IP111 | VLAN1 | | |
| | IP121 | VLAN2 | | |
| | ⋮ | ⋮ | | |
| GIP2 | IP31 | VLAN3 | | |
| | | | | |
| ⋮ | | | | |

FIG. 9

MULTICAST MONITORING TABLE 230

| IP MULTICAST GROUP ADDRESS 231 | TIME STAMP 232 |
|---|---|
| GIP1 | xxxx |
| GIP2 | xxxx |
| GIP3 | xxxx |
| ⋮ | ⋮ |

FIG. 20

TRANSMIT FLAG BIT MANAGEMENT TABLE 170

| IP MULTICAST GROUP ADDRESS (171) | PORT-ID FOR MULTICAST RECEIVING ONU (172) | TRANSMIT FLAG (173) |
|---|---|---|
| GIP1 | P-ONU1 | 1 |
|  | P-ONU2 | 0 |
|  | ⋮ | ⋮ |
| GIP2 | P-ONU5 | 1 |
|  | ⋮ | ⋮ |
| ⋮ | ⋮ | ⋮ |

PON SYSTEM AND OPTICAL NETWORK UNIT

CLAIM OF PRIORITY

The present application claims priority from Japanese application JP 2006-131180 filed on May 10, 2006, the content of which is hereby incorporated by reference into this application.

FIELD OF THE INVENTION

This invention relates to the passive optical network (PON: Passive Optical Network) system, specifically relates to send control of a multicast configuration frame in the optical network unit in a PON system and distribution control of multicast data to a user terminal.

BACKGROUND OF THE INVENTION

As the use of the Internet has become popular and various kinds of information services via networks have been provided, communication networks have occupied an important status among social infrastructures. Internet accesses from ordinary homes and enterprise bases are growing, and consequently access lines connecting theses communication sites and communication offices need to be improved for high speed and large capacity.

As one of access networks to be connected to wide area networks, such as the Internet, there is the passive optical network (PON) system whereby plural subscriber terminals can share a strand of optical fiber. The PON system consists of plural ONUs (Optical Network Units) each of which accommodates a single or plural user terminals and an OLT (Optical line terminal) that is connected to these ONUs through an optical fiber network. An Optical fiber connected to the OLT is connected to branch optical fibers connected to respective ONUs via an optical splitter (optical coupler) and plural ONUs (user terminals) share an optical transmit line between the optical splitter and the OLT, which enables installation cost of optical fibers to be curtailed greatly.

The following are known as the PON system, for example: B-PON (Broadband PON) in which information is sent by a fixed-length ATM cell in the optical fiber section (PON section); G-PON (Gigabit-capable PON) that has made possible high-speed data sending of a gigabit class; and GE-PON (Gigabit Ethernet PON) suitable for information transmission by the Ethernet (registered trademark) frame that is becoming popular in LAN's and metro networks.

Both the G-PON and the GE-PON enable the sending of the variable-length frame in the PON section, and their standardization and technical examination are being carried out in ITU-T and IEEE, respectively. As an ITU-T recommendation about G-PON, there are, for example, nonpatent documents 1-3, which stipulate a GEM (G-PON Encapsulation Mode) frame standard, as a transmit frame standard whereby a general variable-length frame that is not limited by the Ethernet frame is sent to the PON section.

Nonpatent document 1: ITU-T G.984.1, "Gigabit-capable Passive Optical Networks: (GPON) General characteristics"

Nonpatent document 2: ITU-T G.984.2, "Gigabit-capable Passive Optical Networks: (GPON) Physical Media Dependent (PMD) layer specification"

Nonpatent document 3: ITU-T G.984.3, "Gigabit-capable Passive Optical Networks: (GPON) Transmission convergence layer specification"

In the PON system, a downstream frame heading from the OLT to the ONUs is branched to plural branch optical fibers by a splitter, and is broadcast to all the ONUs. Each ONU determines whether the received PON transmit frame is a frame that the local office should perform receive-process of the frame according to destination identification information shown by its header (for example, GEM header). On the other hand, upstream frames heading to the OLT from the ONU side are multiplexed to an optical fiber on the OLT side by the optical splitter. In the upstream direction communication, in order to prevent frames from overlapping on the optical fiber, the TDMA system in which each ONU is allowed to transmit a frame in a transmission time zone allocated by the OLT is adopted.

Since, as can be understood from the above-mentioned configuration, a transmit frame from the OLT is broadcast to all the ONUs in the PON system, the PON system is an access network suitable to distribute the same service information to plural user terminals by multicast. Therefore, for example, in a recently attention-receiving triple play service of broadest, telephone, and data communication, especially when broadcast industries enter network infrastructures, the PON system bears an important part as an access network whereby broadcast program information is distributed.

SUMMARY OF THE INVENTION

However, since a part of the optical fiber section is shared by the plurality of ONUs in the PON system, when a frame destined to a specific ONU (or user terminal) is sent to the PON section, another frame destined to another ONU cannot be sent. Moreover, when a data frame of the same content is transmitted repeatedly from the OLT, a bandwidth compression rate of a transmission line becomes high as compared with a network composed of routers and switches that are common communication nodes.

Therefore, in the PON system, frame sending that effectively uses a bandwidth of the optical transmission line is required. For example, it is desired that a pieces of information, such as a broadcast program, that can be shared among multiple users is transmitted by one round of frame transmission by multicasting it to the plurality of ONUs rather than transmitting frames of the same content to the respective ONUs individually. In the B-PON and the GE-PON, in the case where one frame is multicast to the plurality of ONUs, a destination identifier common to the plurality of ONUs that have been identified beforehand in the PON section (in the case of the G-PON, a multicast port ID; in the case of the GE-PON, a logical link ID) is set on the header of a PON transmit frame.

Conventionally, in the IP multicast, distribution destinations of multicast service information are managed for each multicast group address by the IGMP (Internet Group Management Protocol) or MLD (Multicast Listener Discovery). For example, in the case where the user selects a channel that the user wishes to view according to a broadcast program table previously distributed and requires a multicast server to distribute information on the selected channel, the user terminal issues a multicast requirement message (a multicast group participation request) that includes a specific IP multicast group address determined by the selected channel.

In the PON system, a request message of participation in the multicast is sent to the multicast server in the wide area network via the ONU, a PON section optical fiber network, and the OLT. Each user terminal being connected to the ONU can issue a participation request message freely to the multicast group in which the each user wished to participate in arbitrary timing. Note here that, if the ONU sends a request message received from each user terminal under its control to the PON section one after another, an overlapping participation request to the multicast group whose data is already being distributed will be sent to the OLT repeatedly, and accordingly the communication bandwidth in the upstream direction in the PON section will be consumed vainly.

The same problem occurs with multicast control messages other than the participation request, for example, a request message of secession from the multicast group and a response message issued by each user terminal that is participating in the multicast in response to a confirmation message from the multicast server.

The object of this invention is to provide a PON system and an optical network unit that can suppresses useless transmission of a multicast control message from the ONU to the PON section and use a communication bandwidth in the PON section effectively.

In order to attain the object, this invention has one feature that the optical network unit (ONU) of the PON system is equipped with a filtering function to a multicast control message transmitted from plural user terminals under its control.

Describing this more in detail, the optical network unit according to an aspect of this invention has: a multicast group management table showing a correspondence between a multicast group identifier and an address of the user terminal that is participating in the multicast group; an upstream controller that, when receiving a control message for a request of participation in the multicast group from any of the user terminals, registers a correspondence between the multicast group identifier specified by the control message and the user terminal address and determines whether the control message needs to be sent to the optical line terminal according to the multicast group management table; and a downstream frame send controller that controls distribution of the multicast data received from the passive optical network to the user terminal according to the multicast group management table; wherein, when the upstream frame send controller receives a new control message for a request of participation in the multicast group, if the user terminal address is registered already, along with a correspondence with the multicast group identifier specified by the control message, the upstream frame send controller deletes the control message without sending it to the optical line terminal.

When the upstream frame send controller receives a control message to secede from a multicast group from any of the user terminals, it deletes the correspondence between the multicast group identifier specified by the control message and the user terminal address from the multicast group management table. If another user terminal address is registered already, along with a correspondence with the multicast group identifier specified by the control message, in the multicast group management table, the upstream frame send controller deletes the control message without sending it to the optical line terminal.

The one embodiment of this invention is characterized as follows: The multicast group management table stores first flag information indicating the necessity of response to a confirmation message from the sender device of the multicast data, along with a correspondence with the multicast group identifier. When the upstream frame send controller receives a control message representing a response to the confirmation message from any of the user terminals, it determines whither the control message needs to be sent to the optical line terminal according to a state of the first flag information corresponding to the multicast group identifier specified by the control message.

The first flag information is re-set by the downstream frame send controller, and is set by the upstream frame send controller. Specifically, when the downstream frame send controller receives a confirmation message from the passive optical network, it sends the confirmation message to the user terminal according to the multicast group management table after re-setting the first flag information corresponding to the multicast group identifier specified by the confirmation message. On the other hand, when the upstream frame send controller receives a control message representing a response to the confirmation message from any of the user terminals, if the first flag information indicates a re-set state, it sends the control message to the optical line terminal and changes the first flag information to a set state. At this time, if the first flag information is already the set state, it deletes the control message without sending it to the optical line terminal.

In another embodiment of this invention, each optical network unit stores second flag information indicating the presence or absence of response obligation to the confirmation message from a sender device of the multicast data. While the second flag information indicates the absence of response obligation to the confirmation message, the upstream frame send controller deletes all the control messages each representing a response to the confirmation message received from the user terminal. The second flag information is changed to a state indicating the presence of response obligation to the confirmation message, for example, by a flag control message issued from the optical line terminal.

In further another embodiment of this invention, each optical network unit (ONU) has both a multicast monitoring table for showing a service state of the multicast data in the passive optical network with a correspondence with the multicast group identifier and a multicast monitor for monitoring multicast data received from the passive optical network, and updating a service state indicated by the multicast monitoring table, most basically, a list indicating a flow reception status. When the optical network unit receives a control message indicating a request of participation in the multicast group from any of the user terminals, it determines whether multicast data of the multicast group specified by the control message is in service according to the multicast monitoring table, and, if the specified multicast data is in service, starts to distribute the multicast data to the sender user terminal of the control message without sending the control message to the optical line terminal.

In this case, the upstream frame send controller performs as follows: When another user terminal address is registered already, along with a correspondence with the multicast group identifier specified by the control message, in the multicast group management table, it deletes the control message without sending the message to the optical line terminal; and when another user terminal address corresponding to the multicast group identifier specified by the control message in the multicast group management table is unregistered, it determines whether the control message needs to be sent to the optical line terminal according to the multicast monitoring table.

In order to attain the object, another feature of this invention is as follows: A PON system consists of plural optical network units (ONUs) each of which accommodates plural user terminals and an optical line terminal (OLT) connected to a wide area network, wherein the optical line terminal has a management table showing relay necessity determination information of a multicast control message, along with a correspondence with a multicast group identifier. The optical line terminal (OLT) is configured to, when receiving a control message indicating a request of participation in the multicast group from any of the optical network units, control sending of the control message to the wide area network according to the management table. As the relay necessity determination information in the management table, for example, a user terminal address indicated by the control message of a request of participation in the multicast group is stored, like a multicast group management table provided in each optical network unit.

According to an aspect of this invention, communication that effectively uses a communication bandwidth in the PON section is attained by reducing the number of multicast configuration frames sent from each optical network unit to the PON section.

BRIEF DESCRIPTION OF THE DRAWINGS

FIG. 6 is a diagram showing one example of an internal routing table 240 that the ONU 20-$i$ searches;

FIG. 7 is a diagram showing one example of an ARP table 250 that the ONU 20-$i$ searches;

FIG. 8 is a diagram showing one example of a multicast management table 260 that the ONU 20-$i$ searches;

FIG. 9 is a diagram showing one example of a multicast monitoring table 230 that the ONU 20-$i$ searches;

FIG. 20 is a diagram showing a transmission flag bit flag management table that the OLT 10 searches.

DETAILED DESCRIPTION OF THE PREFERRED EMBODIMENTS

First Embodiment

Figure 1:
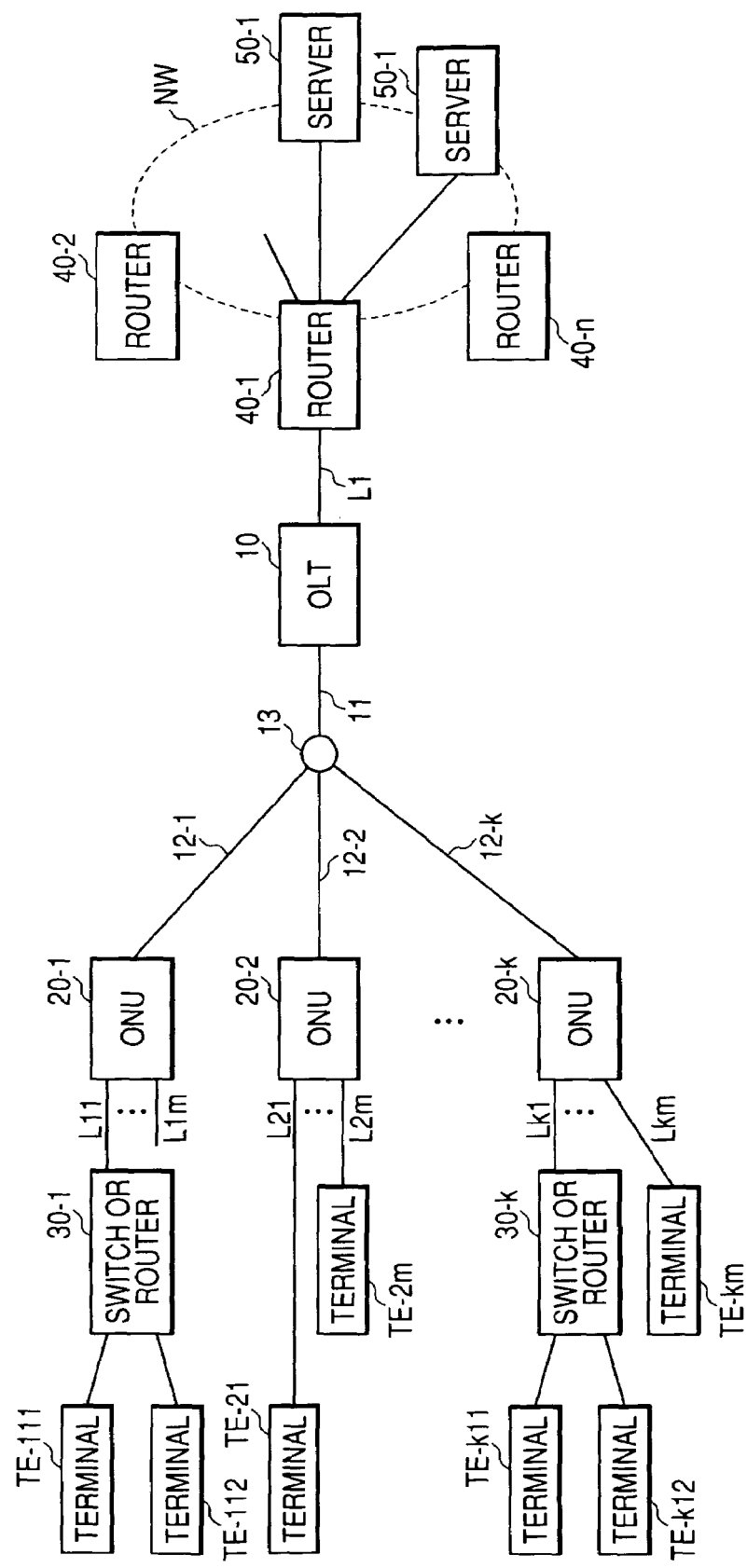
FIG. 1 is a configuration diagram of a PON system to which this invention is applied.

FIG. 1 shows a configuration diagram of a PON system to which this invention is applied.

The PON system consists of an optical line terminal (OLT) 10, plural optical network units (ONUs) 20 (20-1 to 20-$k$), and an optical fiber network of a PON section that connects these constituents. The optical fiber network of the PON section consists of an optical fiber 11 connected to the OLT 10 and branch optical fibers 12-$i$ ($i$=1 to k) connected to the respective ONUs 20-$i$ ($i$=1 to k). The branch optical fibers 12-$i$ are branched from the optical fiber 11 by an optical splitter (optical coupler) 13. Normally, the OLT 10 is installed in a customer line accommodation office that a carrier company or ISP (Internet Service Provider) possesses and the ONUs 20-$i$ ($i$=1 to k) are installed in buildings, such as an office building and an apartment building, or a user premises. In the embodiment below, a case where G-PON (Gigabit-capable PON) is applied as a communication protocol of the PON section. However, this invention is also effective when any of other communication protocols, for example, GE-PON (Gigabit Ethernet PON), is applied to the PON section.

Each ONU 20-$i$ accommodates plural user terminals TEs via plural user connection lines Lij ($j$=1 to m). There are two cases for connection of the user terminals: A case where the user terminals are connected to the ONU 20-1 (ONU 20-$k$) via customer routers or customer switches 30-1 (30-$k$), as shown by TE-111 and TE-112 (TE-k11, TE-k12), for example; and a case where the user terminals are directly connected to an ONU 20-2 (ONU 20-$k$), as shown by TE-21, TE-2$m$ (TE-km), for example.

NW denotes a wide area network (including an ISP network) consisting of plural routers 40 (40-1 to 40-$n$). Each user terminal TE connected to the PON system communicates with servers 50 (50-1, 50-2) connected to the wide area network NW via the ONU 20-$i$, the OLT 10, and the routers 40-1.

Although in FIG. 1, the servers 50-1 and 50-2 are directly connected to the router 40-1 for simplification, further another router can exist between these servers 50-1, 50-2 and the router 40-1. Moreover, in addition to the servers 50-1, 50-2, a large number of servers that can be accessed by each server terminal exist in the network NW, but are omitted in FIG. 1. In the explanation below, it is assumed that the server 50-1 provides a multicast service of broadcast programs and the server 50-2 provides an information service other than the multicast.

When the OLT 10 receives a frame, for example, being sent from the server 50-2 to the user terminal TE-111, from a communication line L1 via the router 40-1, the OLT 10 converts this received frame into a frame format (in the case of the G-PON, the GEM frame) in conformity of an inherent transmission layer protocol in the PON section, and sends it to the optical fiber 11. In the PON section, the downstream frame that the OLT 10 sent to the optical fiber 11 is branched by the splitter 13 to branch optical fibers 12-1 to 12-$k$, and is broadcast to all the ONUs 20-1 to 20-$k$.

An inherent port ID is assigned to the each ONU 20-$i$ in the PON. Each ONU searches for destination identification information (port ID) that is shown in the header of a received frame (in the case of the G-PON, the GEM header), and performs reception processing of a frame whose destination identification information agrees with the personalized port ID or a frame whose destination identification information indicates a multicast port ID, deleting received frames other than that. The GEM header including a port ID inherent to the ONU 20-1 is added to the GEM frame including a frame destined to the user terminal TE-111. Therefore, only the ONU 20-1 performs reception processing of this GEM frame. The ONU 20-1 removes the GEM header from the GEM frame, and sends the received frame to the connection line L11 connected to the user terminal TE-111 according to destination information indicated by the header of the received frame.

On the other hand, upstream frames heading to the network from the ONUs 20-1 to 20-$k$ are transmitted using individual time zones allocated to the respective ONUs beforehand, that is, the frames reach the OLT 10 being time-multiplexed on the optical fiber 11. The OLT 10 sends the upstream frame received from the optical fiber 11 to the router 40-1, if necessary, after the format is converted.

Figure 2:
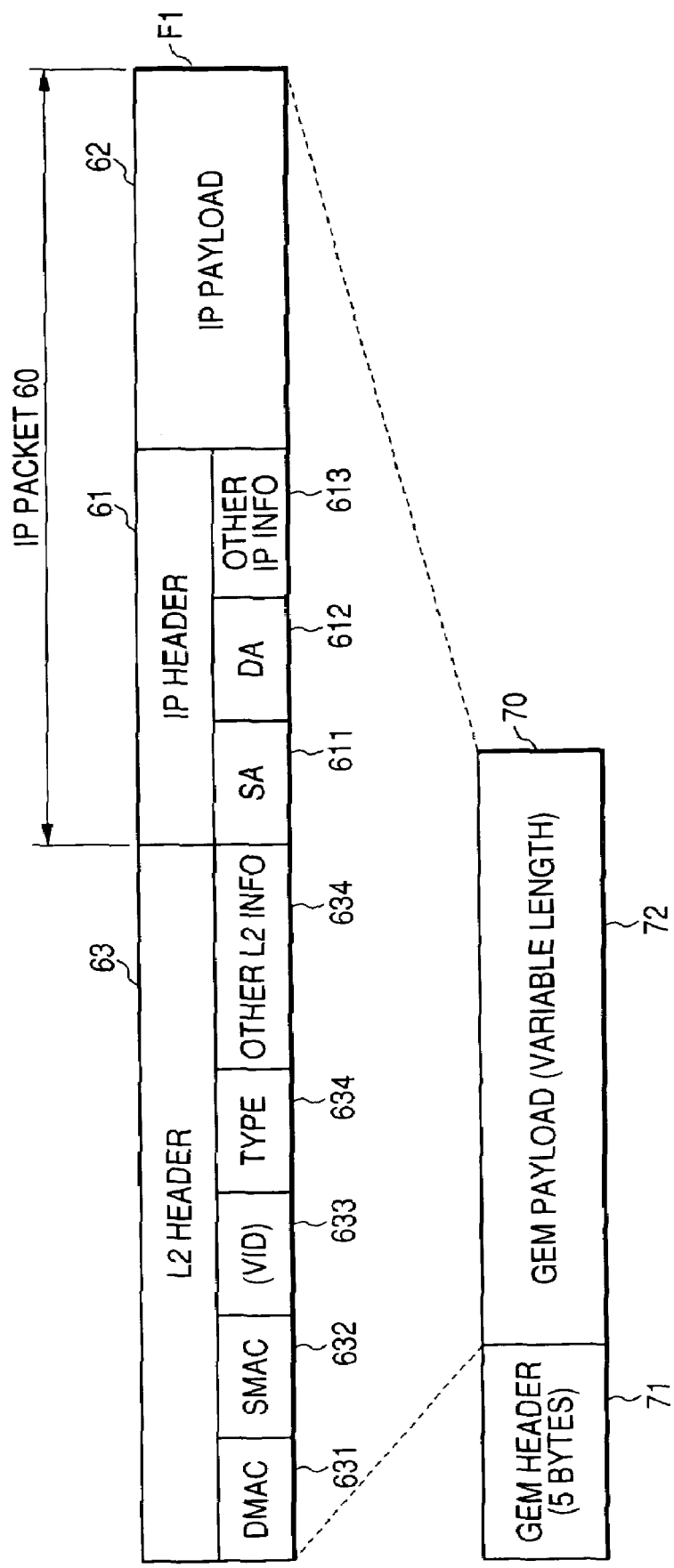
FIG. 2 is a diagram showing an Ethernet frame F1 that an OLT 10 receives from a wide area network and a format of a downstream GEM frame 70 sent to the PON section.

FIG. 2 shows a format of a downstream communication frame F1 that the OLT 10 receives from the router 40-1 in the case where a communication protocol between the OLT 10 and the router 40-1 is Ethernet.

The received frame F1 from the router 40-1 consists of an IP packet 60 and an L2 header 63. The IP packet 60 is composed of an IP header 61 and an IP payload 62. The IP header 61 contains a sender's IP address (SA) 611, a destination IP address (DA) 612, and other IP information (header). Here, the sender's IP address (SA) 611 of the IP header represents a sender of the IP packet, for example, an IP address of the server 50-2; the destination IP address (DA) 612 represents an IP address of a user terminal that becomes a destination of the IP packet.

In this embodiment, the L2 header 63 is an Ethernet header, containing a destination MAC address (DMAC) 631, a sender MAC address (SMAC) 632, a protocol type 634, and other IP information (header) 635. A value showing that the packet is an IP address is set in the protocol type 634 representing a kind of a header following the L2 header in this embodiment. The DMAC 631 represents the MAC address of a user terminal that is the destination of the Ethernet frame; the SMAC represents the MAC address of the router 40-1 that is the sender of the Ethernet frame. In the case where the user terminal uses a VLAN (Virtual LAN) formed between itself and the router 40-1 to transmit and receive a frame in order to enhance security of communication, the L2 header 63 contains a VLAN identifier (VID) 633.

In FIG. 2, a reference numeral 70 denotes a format of the downstream GEM frame in the PON section.

The GEM frame 70 is composed of a 5-byte GEM header 71 and a variable-length GEM payload 72. For downstream frames in the PON section, reception control is performed according to a port ID contained in the GEM header 71. The OLT 10 sets the received frame F1 from the router 40-1 in the GEM payload 72, and sets a port ID to specify an ONU that should receive the received frame F1 in the GEM header 71. When the received frame F1 from the router 40-1 is a multicast frame sent by the server 50-1, the OLT 10 sets the received frame F1 from the router 40-1 in the GEM payload 72, and sets a port ID for multicast determined beforehand in the GEM header 71.

Figure 3:
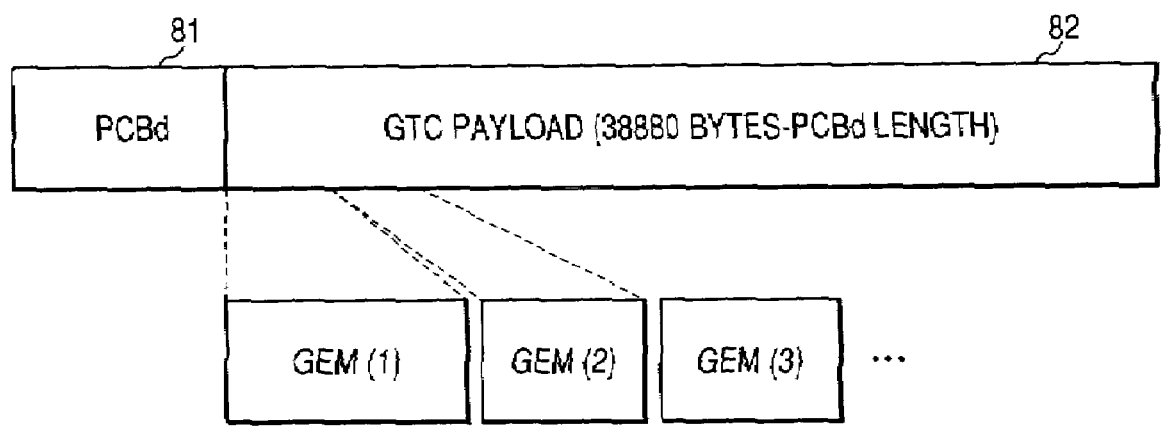
FIG. 3 is an explanatory diagram of a relation between a GTC downstream frame and the GEM frame in the PON section.

FIG. 3 shows a format of a GTC (G-PON Transmission Convergence) downstream frame 80 sent to the optical fiber 11 from the OLT 10.

The GTC downstream frame 80 is composed of a PCBd (Physical Control Block downstream) 81 that will become a header and a GTC payload 82, having a total length of 38880 bytes in the case of 2.48832 Gbps. The GEM frame explained with reference to FIG. 2 is mapped in the GTC payload 82 as shown by GEM (1) and GEM (2) in FIG. 3. Assuming that the number of bandwidth control units that the OLT notifies to the ONUs 20-1 to 20-$k$ is N, the length of the PCBd area becomes "30+8×N" bytes and the length of the GTC payload becomes "38880−PCBd length."

Figure 4:
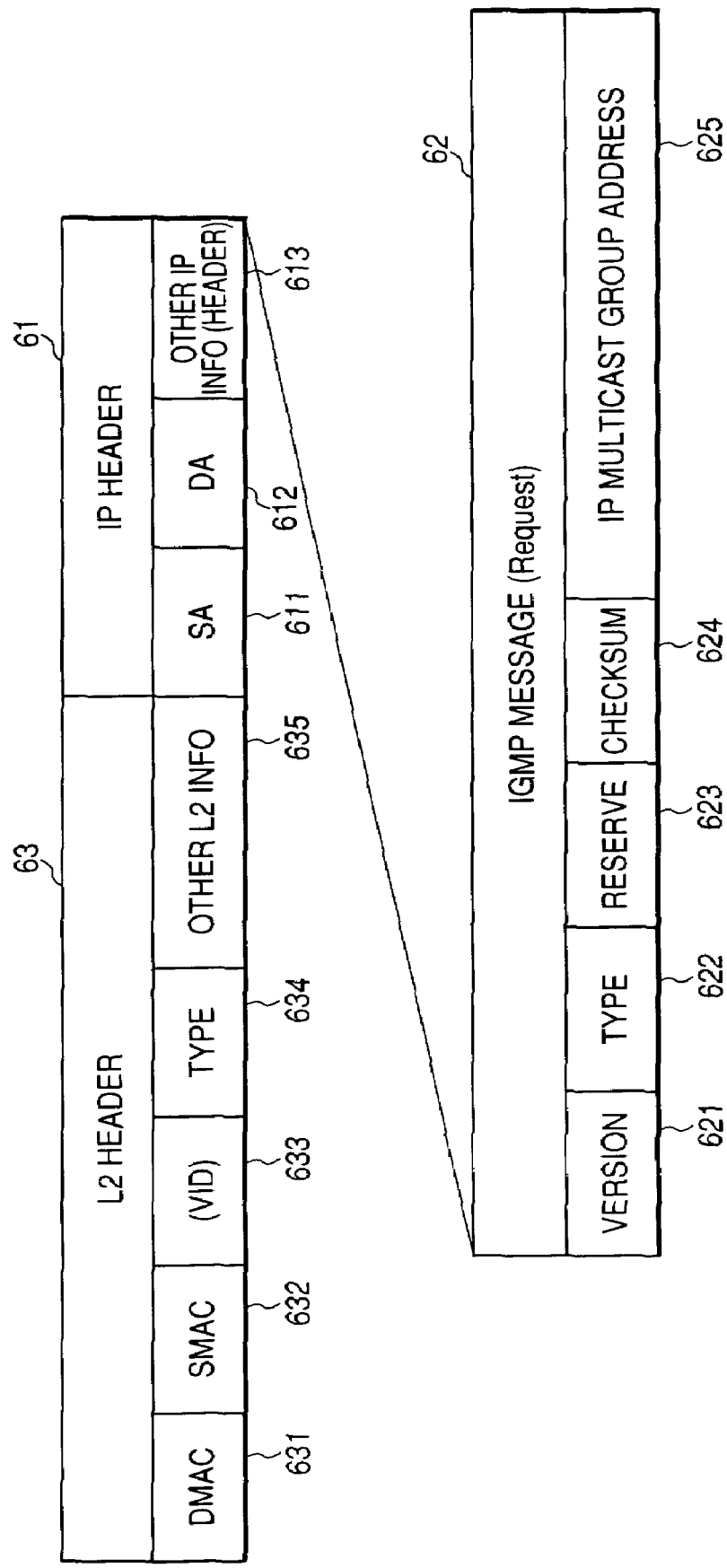
FIG. 4 is a diagram showing a format of an IGMP message frame.

FIG. 4 shows a format of the Ethernet frame whose IP payload 62 contains a request message of participation in the multicast group of the IGMP issued by the user terminal.

The IGMP message consists of a protocol version field 621, a message type field 622, a spare (reserve) field 623, a checksum field 624, and an IP multicast group address field 625.

The destination MAC address DMAC 631 of the L2 header 63 is set as an address of the router 40-1, and the sender MAC address SMAC 632 is set as a MAC address of the sender user terminal. The IP address of the user terminal of a request source is set as a sender's IP address 611 of the IP header 61, and an address value dependent on the message type 622 is set as the destination address 612.

The above-mentioned frame format is also applied to other control messages of the IGMP. For example, in the case where the IP payload 62 contains a request message of participation in the multicast group issued by the user terminal or a response message (=report) to a confirmation message (=Query) that will be described later, a value of the IP multicast group address is set as the destination IP address 612. In the case where the IP payload 62 contains a confirmation message (Query) issued by the server or in the case where the payload contains the multicast secession message (Done or Leave) issued by the server, a value of the IP address determined beforehand is set up, respectively.

Figure 5:
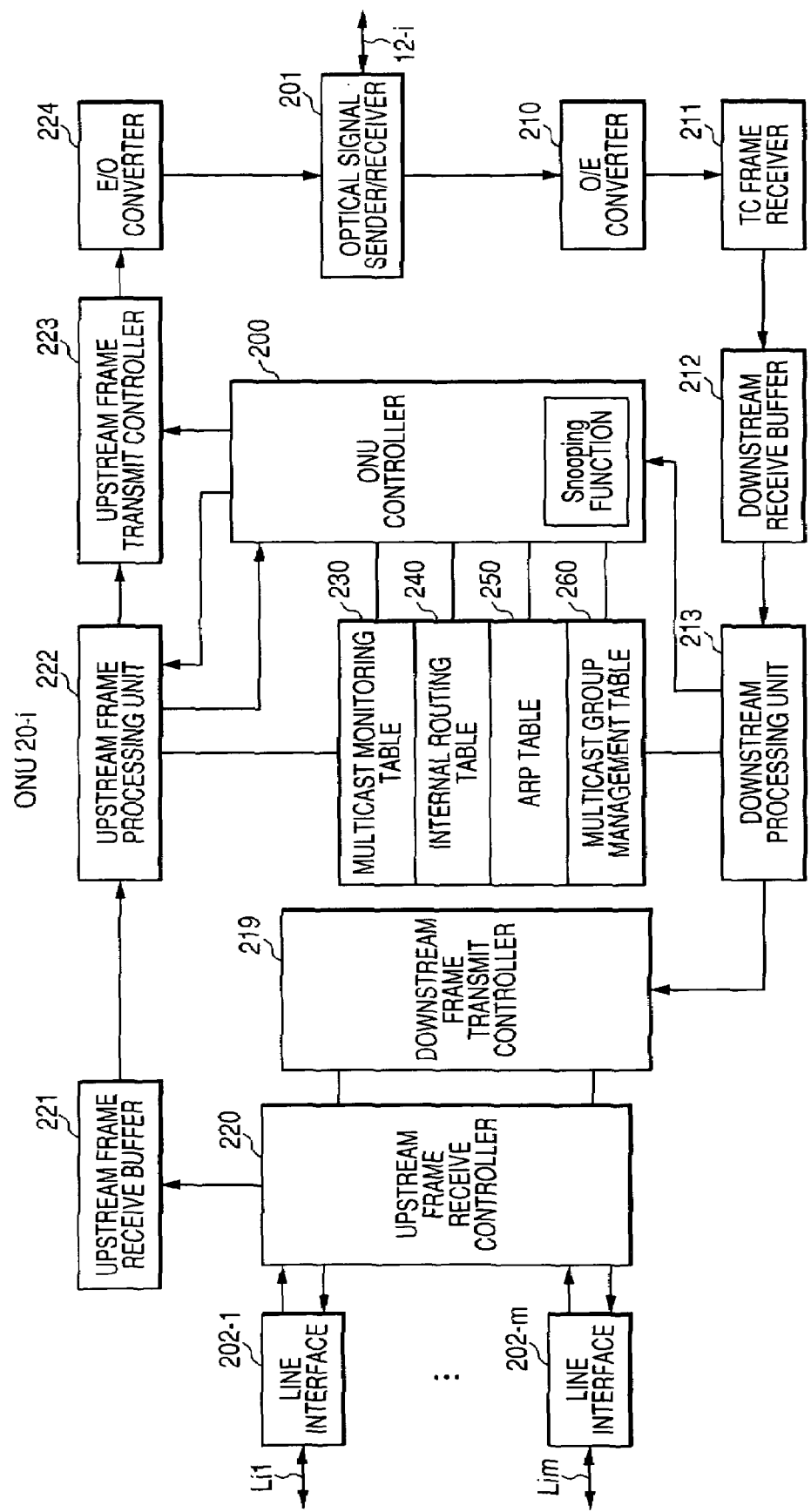
FIG. 5 is a block diagram showing one embodiment of an ONU 20-$i$ according to an aspect of this invention.

FIG. 5 is a block diagram showing one embodiment of the ONU 20-$i$ according to an aspect of this invention.

The ONU 20-$i$ consists of an ONU controller 200, an optical signal sender/receiver 201 connected with a branch optical fiber 12-$i$, plural line interfaces 202-1 to 202-$m$ connected to user terminal connection lines Li1 to Lim, respectively, a downstream transmit controller 219 and an upstream receive controller 220 connected with these line interfaces, a downstream signal processing unit provided between the optical signal sender/receiver 201 and the downstream transmit controller 219, and an upstream signal processing unit provided between the optical signal sender/receiver 201 and the upstream receive controller 220.

The downstream signal processing unit consists of an O/E converter 210 for converting an optical signal received by the optical signal sender/receiver 201 into an electric signal, a TC frame receiver 211 that terminates a GTC frame based on the output signal from the O/E converter 210 and outputs a GEM frame extracted from the GTC payload one by one, a downstream receive buffer 212 for accumulating the GEM frame temporarily, and a downstream frame processing unit 213 that analyzes a GEM frame read from the downstream receive buffer 212, as will be described later, and sends an Ethernet frame extracted from the GEM frame to the downstream transmit controller 219 in a frame format with an internal header added thereto.

The downstream frame processing unit 213 functions as a downstream frame send controller in cooperation with the downstream transmit controller 219. Detailed operation of the downstream frame processing unit 213 will be described later with reference to FIG. 12. When the downstream transmit controller 219 receives a frame from the downstream frame processing unit 213, the downstream transmit controller 219 specifies at least one connection line Lij that will become a frame sending destination according to a line number Nij indicated by the internal header of the received frame, and sends the downstream Ethernet frame from which the internal header is removed to the line interface 202-j corresponding to this specific line.

On the other hand, the upstream signal processing unit consists of an upstream frame buffer 221 for temporarily accumulating an upstream transmit frame that the upstream receive controller 220 received from the line interfaces 202-1 to 202-m, an upstream frame processing unit 222 that reads out a transmit frame from the upstream frame buffer 221, analyzes header information, and sends it as an upstream frame, an upstream transmit controller 223 for transmitting a transmit frame sent from the upstream frame processing unit 222 in a transmission time slot specified by the ONU controller 200, and an E/O converter 224 for converting the output signal from the upstream transmit controller 223 into an optical signal and sending it to the optical signal sender/receiver 201.

The upstream frame processing unit 222 functions as a frame send controller in cooperation with the ONU controller 200. The upstream frame processing unit 222 determines the frame kind from header information of the transmit frame and determines whether the frame needs to be sent to the PON section by searching a multicast group management table 260 that will be described later. The transmit frame determined to need to be sent is converted into a GEM frame, and sent to the upstream transmit controller 223. A feature of this invention is in that, as will be described later with reference to FIG. 11, the upstream frame processing unit 222 is configured to selectively delete an IGMP message.

If the transmit frame is any of previously specified kinds of configuration frames, for example, an IGMP message frame and an ARP packet frame to inquire a MAC address corresponding to the IP address, the upstream frame processing unit 222 transmits a copy of the transmit frame to the ONU controller 200.

The ONU controller 200 is equipped with memory in which a multicast monitoring table 230, an internal routing table 240, an ARP table 250, the multicast group management table 260, etc. are formed. This memory is also used for storing data other than the tables. The multicast monitoring table 230 is a table related to a second embodiment of this invention, and can be omitted in this embodiment.

The internal routing table 240 consists of, as shown in FIG. 6, plural table entries each showing a correspondence between a destination MAC address (DMAC) 241 of an user terminal accommodated in the ONU-i and a line number 242 connected to the user terminal, and a table entry for multicast. In the table entry for multicast, a multicast number to specify all the line number as the line number 242 corresponding to the multicast MAC address 241. The downstream frame processing unit 213 searches the internal routing table 240 in order to specify a line number that is a frame sending destination and generate an internal header 64 that should be added to the downstream.

The ARP table 250 consists of, as shown in FIG. 7, plural table entries each showing a correspondence between an IP address 251 and a MAC address 252. When the user terminal acquires an IP address pursuant to, for example, DHCP (Dynamic Host Configuration Protocol) or RADIUS (Remote Authentication Dial In User Service) and subsequently transmits an ARP packet in order to check whether the same IP address is also allocated to another user terminal redundantly, a snooping function of the ONU controller 200 generates a table entry of the ARP table 250 based on the content of the ARP packet.

The multicast group management table 260 consists of, as shown in FIG. 8, plural table entries each showing a correspondence among an IP multicast group address (multicast group identifier) 261, a multicast group participant terminal's IP address (participant's IP address) 262, a VLAN identifier (VID) 263, a time limit 264, and a report flag 265.

Note that the VID 263 is information needed when the user terminal communicates using the VLAN, and is not an information item essential in the multicast group management table 260. The time limit 264 is used when a table entry that becomes unnecessary is automatically deleted; the report flag 265 is used in order to determine whether a Report massage needs to be sent to the OLT 10.

The snooping function of the ONU controller 200 generates the table entry of the multicast group management table 260 based on contents of the participation request message when the user terminal transmits a request message of participation in the multicast group to the server pursuant to the IGMP. The multicast group management table 260 is, as will be described later, searched by the upstream frame processing unit 222 in order to determine whether the IGMP message frame needs to be sent to the OLT. In addition, the downstream frame processing unit 213 searches this table in order to determine whether the downstream multicast frame needs to be sent to the user terminal.

Figure 10:
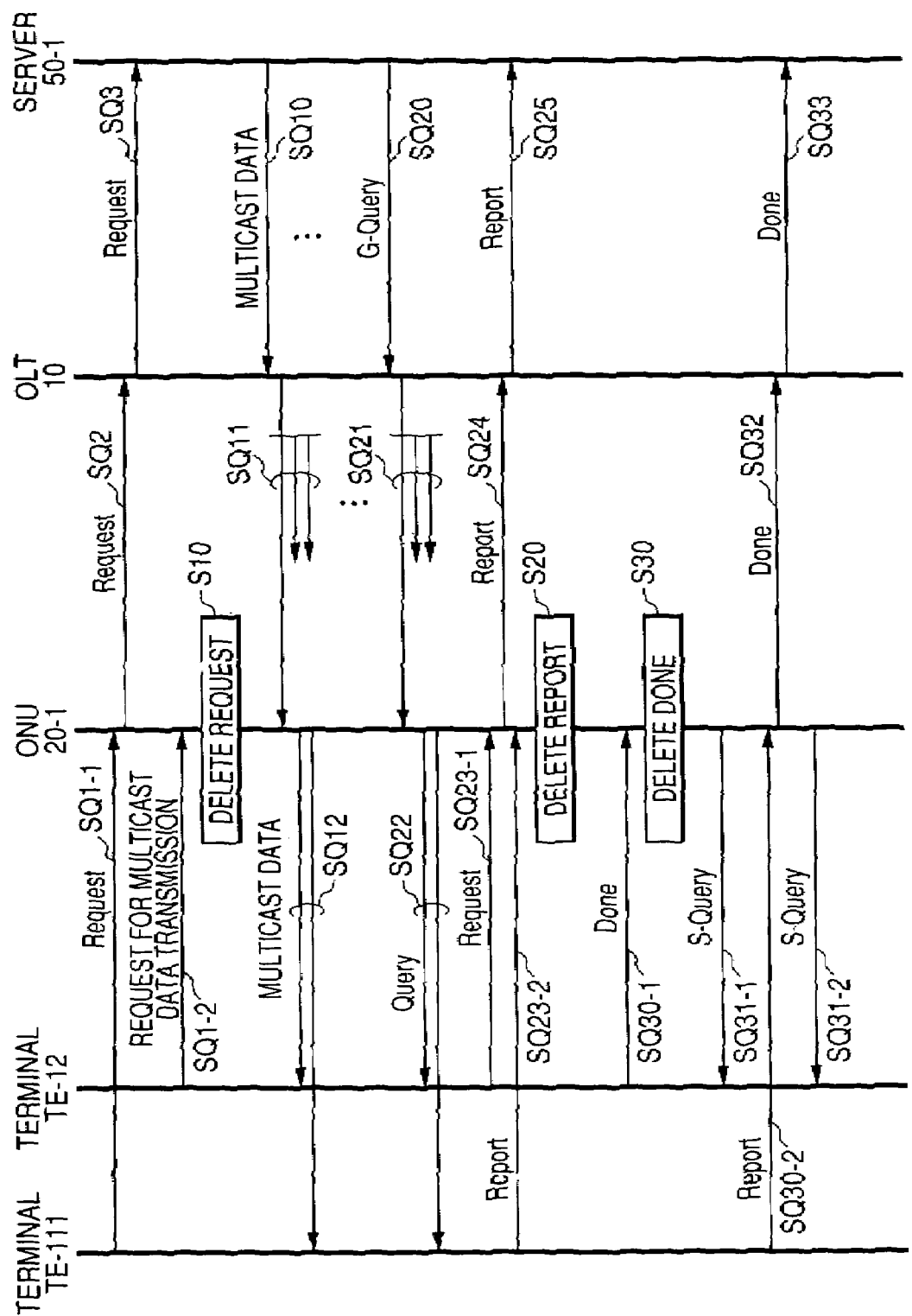
FIG. 10 is a sequence diagram showing the a first embodiment of send control of an IGMP message and multicast data according to an aspect of this invention.

FIG. 10 is a sequence diagram showing the first embodiment of send control of the IGMP message and the multicast data according to an aspect of this invention. Here, paying attention to the ONU 20-1, features of this embodiment will be explained.

When the ONU 20-1 receives request messages of participation (multicast Requests) in the same multicast group from two or more user terminals under its control, for example, TE-111 and TE-12 (SQ1-1, SQ1-2), the ONU 20-1 sends a first request message to the OLT 10 (SQ2) and deletes request massages received after that (S10). The OLT 10 sends the request message received from the ONU 20-1 to the server 50-1 (SQ3).

Determination as to whether the received request message is sent to the OLT 10 or deleted is made according to the multicast group management table 260 shown in FIG. 8. In the multicast group management table 260, every time a request message is received, a new table entry indicating an IP address of a participant user is registered, along with a correspondence with the IP multicast group address indicated by the received message, and if an IP address of another user is registered already in the same IP multicast group address, all the request messages received after that are deleted. The request message received from the user terminal TE-12 is deleted for such a reason.

The server 50-1 responds to the participation request message, and starts transmission (SQ10) of the multicast data of the OLT 10. The multicast data is sent to the PON section by the OLT 10 (SQ11). When the ONU 20-1 receives the multicast data, the ONU 20-1 sends it to the user terminals TE-111 and TE-12 according to participants' IP addresses 262 indicated by the multicast group management table 260.

The server 50-1 transmits a confirmation message G-Query (General Query) of the IGMP to the OLT 10 periodically in order to check a receiving status of the multicast data on the downstream side (SQ20). The OLT 10 sends the confirmation message to the PON section (SQ21). When the ONU 20-1 receives the confirmation message, the ONU 20-1 sends it to the user terminals TE-111 and TE-12 according to participants' IP addresses 262 indicated by the multicast group management table 260 (SQ22).

When the user terminals TE-111 and TE-12 being receiving the multicast data receives the confirmation message, each sends back a response message (Report) that is intended to continue reception of the multicast data (SQ23-1, SQ23-2). In this embodiment, the ONU 20-1 sends only the response message received first to the OLT 10 (SQ24), and deletes the response message received after that (S20). The response message transmitted from the ONU 20-1 is sent to the server 50-1 by the OLT 10 (SQ25).

Sending/deleting of the response message is also determined according to the multicast group management table 260 shown in FIG. 8. In this case, the report flag 265 is used. When the ONU 20-1 receives a confirmation message (G-Query) from the OLT 10, the IP multicast group address indicated by this confirmation message and the corresponding report flag 265 are re-set (to be a "0" state), and when the ONU 201-receives a first response message, the report flag 265 is set up (to be a "1"state). The ONU 20-1 searches for the report flag each time receiving a response message. If the flag represents the re-set state, the ONU 20-1 sends the response message to the OLT 10; if the flag represents the set state, the ONU 20-1 avoids transmission of redundant response messages to the OLT by deleting the response message.

When each user terminal terminates reception of the multicast data, each user terminal issues a request message of secession from the multicast group (Leave or Done message, hereinafter referred to as the Done message). When the ONU 20-1 receives the Done message from the user terminal TE-12 (SQ30-1), the ONU 20-1 searches the multicast group management table 260. If the ONU 20-1 finds that there exists a user terminal, except the user terminal TE-12, receiving the multicast data, the ONU 20-1 deletes the received Done message (S30), and transmits a confirmation message S-Query (Specific Query) that is local on the ONU side to the sender user terminal TE-12 in order to confirm secession (SQ31-1).

As will be described in detail, when the ONU 20-1 receives the Done message from the user terminal, the ONU 20-1 shortens the time limit 264 of a table entry that corresponds to the sender user terminal of the Done message in the multicast group management table 260, and, when a time reaches the time limit 264, issues the S-Query message. If the ONU 20-1 cannot receive a response to the S-Query message within a predetermined time, the ONU 20-1 deletes the table entry corresponding to the user terminal TE-12 from the multicast group management table 260.

Also when the ONU 20-1 receives the Done message from the user terminal TE-111 (SQ30-2), the ONU 20-1 searches the multicast group management table 260. In this case, since the ONU 20-1 finds that except the user terminal TE-111, there exists no user terminal, receiving multicast data, the ONU 20-1 sends the Done message to the OLT 10 (SQ32) and transmits a local confirmation message (S-Query) for secession confirmation to the sender user terminal TE-12 (SQ31-2). The Done message is sent to the server 50-1 by the OLT 10 (SQ33). A table entry of the user terminal TE-111 is deleted from the multicast group management table 260 if there is no response message to the S-Query message within a predetermined time.

As is clear from the communication sequence, according to this embodiment, since transmission of the redundant IGMP messages from the ONU 20 to the OLT 10 is suppressed, each ONU can effectively use the upstream communication bandwidth of the PON section. Moreover, since the number of times of reception of the IGMP message from the downstream side decreases, a load of reception processing of the IGMP message in both the OLT 10 and the server 50-1 can be mitigated.

Figure 11:
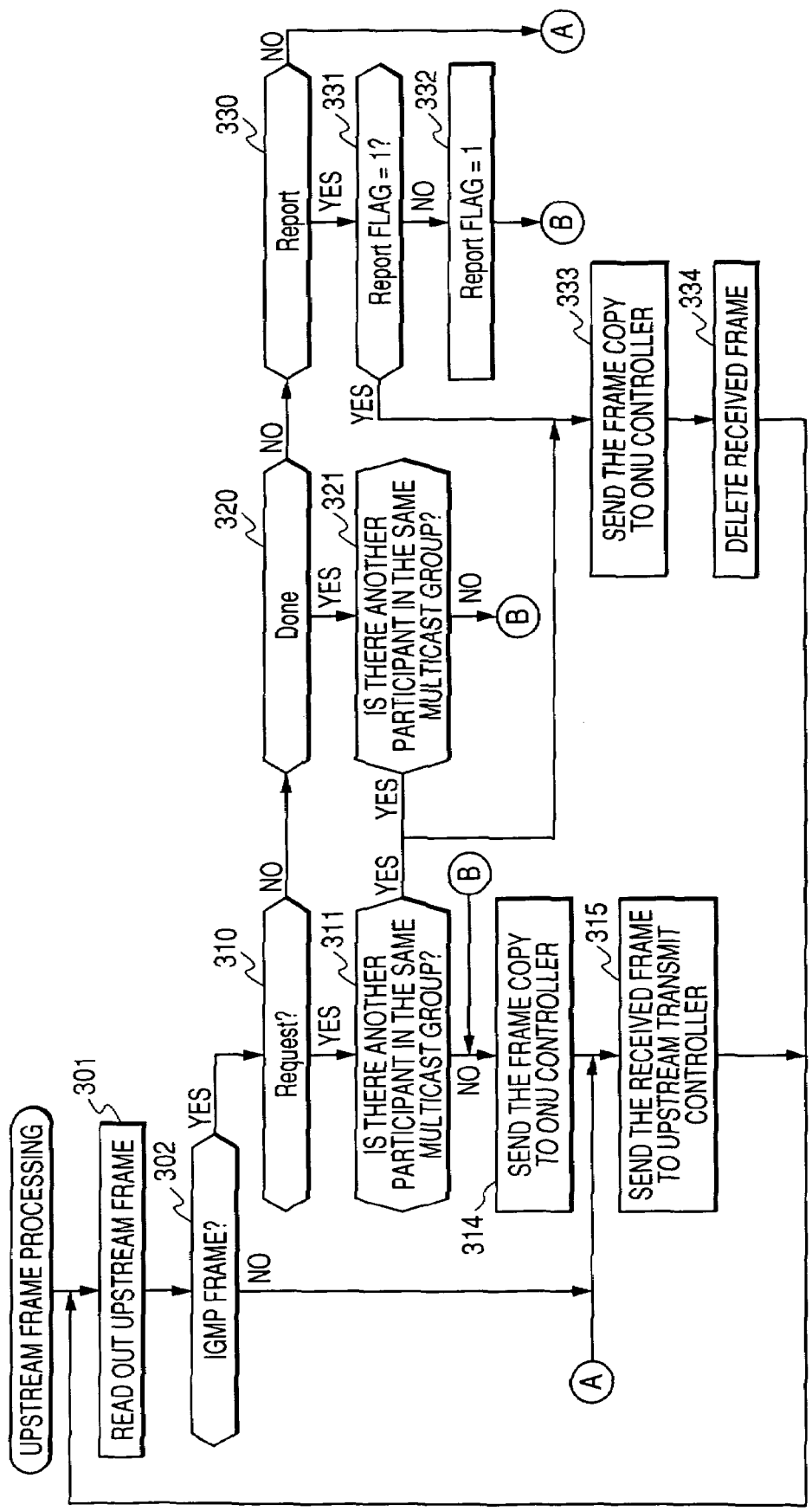
FIG. 11 is a flowchart showing an operation of an upstream frame processing unit 222 of the ONU in the first embodiment.

FIG. 11 is a flowchart showing an operation of the upstream frame processing unit 222 of the ONU.

The upstream frame processing unit 222 of the ONU reads out the upstream frame from the upstream receive buffer 221 (Step 301) and determines whether the received frame is an IGMP message frame (Step 302). If the received frame is not an IGMP message frame, the upstream frame processing unit 222 sends this frame to the upstream transmit controller 223 (Step 315), and reads out the next upstream frame from the upstream receive buffer 221 (Step 301). If the received frame is an IGMP message frame, the upstream frame processing unit 222 performs processing that depends on its message type.

When the received frame contains a Request message (Step 310), the upstream frame processing unit 222 searches the multicast group management table 330 and determines whether another participant's IP address 262 is registered already in the same multicast group as the IP multicast group address 625 indicated by the Request message (Step 311). If the participant's IP address 262 is unregistered, the upstream frame processing unit 222 sends a copy of the received frame (Request message) to the ONU controller 200 (Step 314), sends the received frame to the upstream transmit controller 223 (Step 315), and reads out the next upstream frame from the upstream receive buffer 221 (Step 301).

If the participant's IP address 262 is registered already, the upstream frame processing unit 222 sends a copy of the received frame (Request message) to the ONU controller 200 (Step 333), deletes the received frame (Step 314), and reads out the next upstream frame from the upstream receive buffer 221 (Step 301). In this case, the upstream frame processing unit 222 may send the received frame itself to the ONU controller 200 in Step 333 instead of deleting the received frame.

If the received frame contains the Done message (Step 320), the upstream frame processing unit 222 searches the multicast group management table 260 and determines whether another participant's IP address 262 is registered already in the same multicast group as the IP multicast group address 625 indicated by the Done message (Step 321). If another participant's IP address 262 is unregistered, the upstream frame processing unit 222 sends a copy of the received frame (Done message) to the ONU controller 200 (Step 314), sends the received frame to the upstream transmit controller 223 (Step 315), and reads out the next upstream frame from the upstream receive buffer 221 (Step 301).

If another participant's IP address 262 is registered already, the upstream frame processing unit 222 sends a copy of the received frame (Done message) to the ONU controller 200 (Step 333), deletes the received frame (Step 334), and reads out the next upstream frame from the upstream receive buffer 221 (Step 301). Also in this case, the upstream frame processing unit 222 may send the received frame itself to the ONU controller 200 in Step 333 instead of deleting the received frame.

If the received frame contains a Report message (Step 330), the upstream frame processing unit 222 searches the multicast group management table 260, and determines a state of the report flag corresponding to the IP multicast group address 625 indicated by the Report message (Step 331). If the report flag is in the re-set state, the upstream frame processing unit 222 sets a report flag (Step 332), subsequently sends a copy of the received frame (Report message) to the ONU controller 200 (Step 314), sends the received frame to the upstream transmit controller 223 (Step 315), and reads out the next upstream frame from the upstream receive buffer 221 (Step 301). If a report flag is already in the set state, the upstream frame processing unit 222 sends a copy of the received frame (Report message) to the ONU controller 200 (Step 333), deletes the received frame (Step 334), and reads out the next upstream frame from the upstream receive buffer 221 (Step 301). Also in this case, the upstream frame processing unit 222 may send the received frame itself to the ONU controller 200 in Step 333 instead of deleting the received frame.

If the received frame contains messages other than Request, Done, and Report described above, the upstream frame processing unit 222 sends the received frame to the transmit controller 223 (Step 315), and reads out the next upstream frame from the upstream receive buffer 221 (Step 301).

The snooping function of the ONU controller 200 updates the multicast group management table 260 according to message types of the IGMP message frame received from the upstream frame processing unit 222 and the IGMP message frame received from the downstream frame processing unit 213 that will be described later.

If the received frame is the Request message frame, the snooping function generates new table entries such that the IP multicast group address 625 of the received frame and the sender's IP address are set to the IP multicast group address 261 and the participant's IP address 262, respectively, and adds them to the multicast group management table 260.

At this time, a value of the current time with a predetermined value, for example, 255 seconds, added thereto is set in the time limit 264 of the table entry. Alternatively, instead of setting the time limit, a timer may be prepared for each table entry and this timer may be made to generate timer interrupt after 255 seconds. If the L2 header of the received frame contains the VLAN identifier (VID), a value of VID extracted from the L2 header is set as the VID 263 in the table entry.

Figure 13:
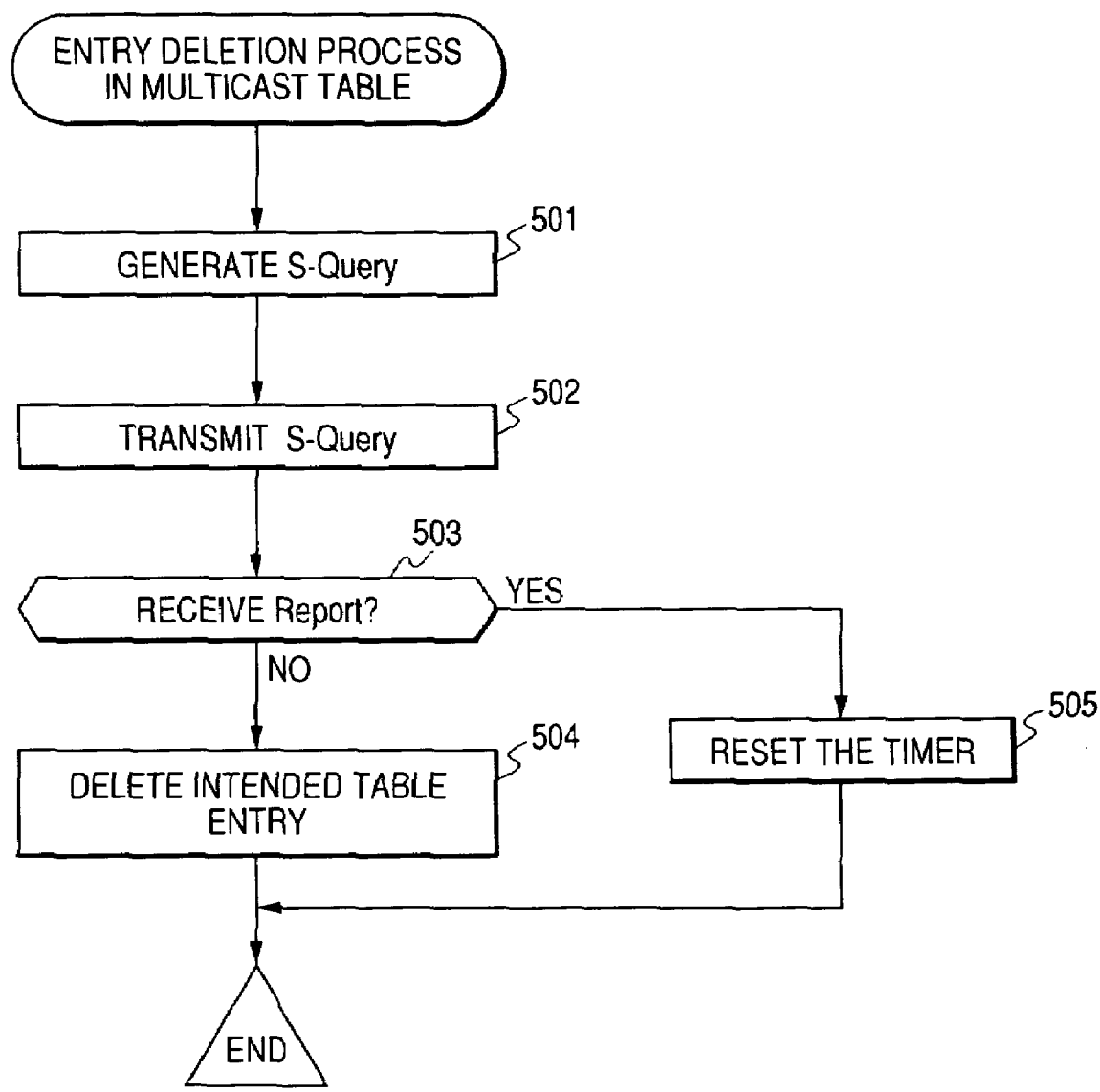
FIG. 13 is a flowchart of a deletion processing routine of a multicast table entry that an ONU controller 200 performs in the first embodiment.

When the received frame is the Done message frame, the snooping function sets a short limit time, for example, a time after 1 second, as the time limit of a table entry that corresponds to the IP multicast group address 265 and the sender's IP address of the received frame in the multicast group management table 260, and, when the time reaches the time limit 264, performs deletion processing of an unnecessary table entry pursuant to a deletion routine of the multicast table entry that will be described later with reference to FIG. 13.

Figure 12:
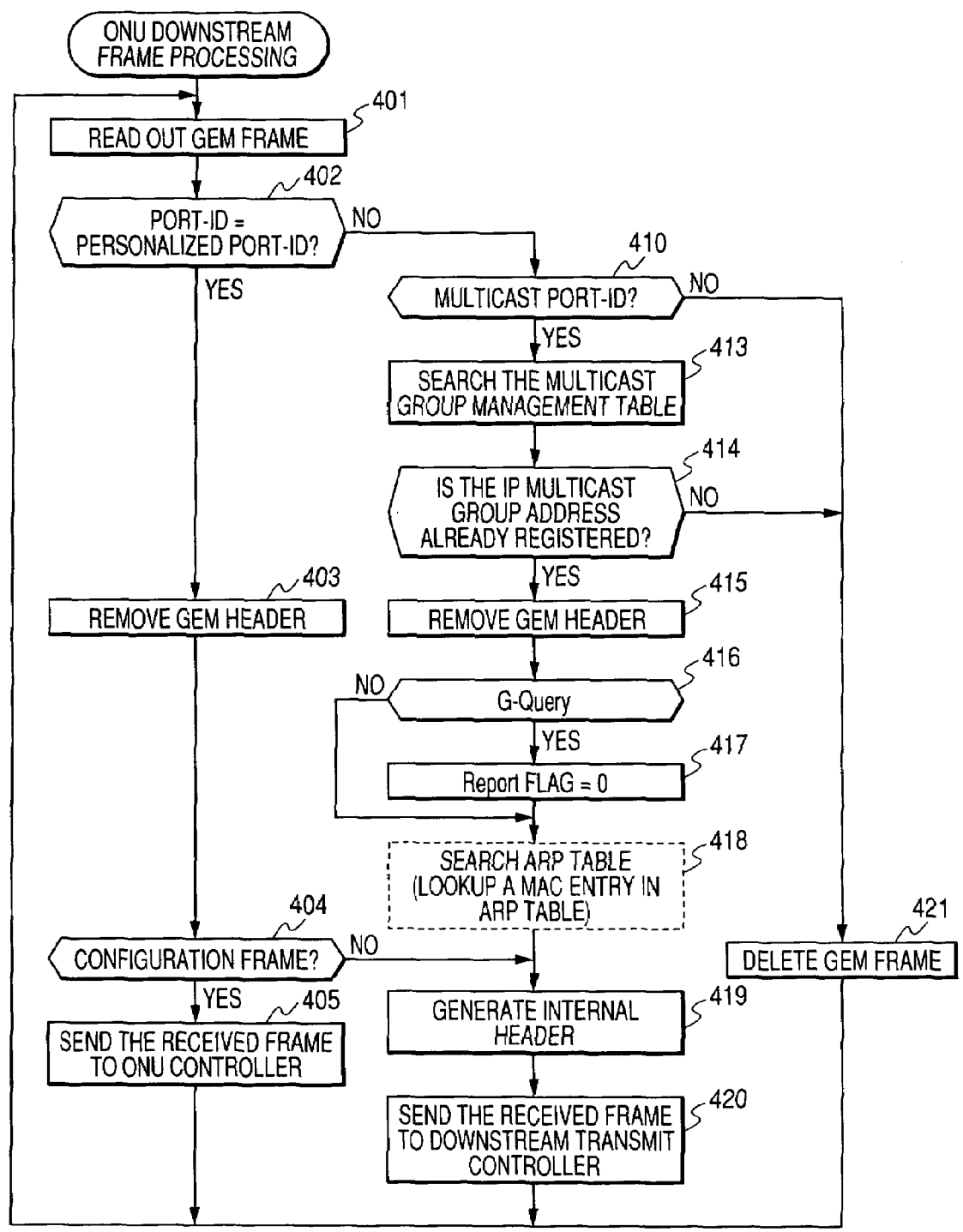
FIG. 12 is a flowchart showing an operation of a downstream frame processing unit 213 of the ONU in the first embodiment.

FIG. 12 is a flowchart showing an operation of the downstream frame processing unit 213 of the ONU.

The downstream frame processing unit 213 reads out the GEM frame from the downstream receive buffer 212 (Step 401), and compares a port ID contained in the GEM header 71 with a personalized port ID (Step 402). If the port IDs agree with each other, the GEM frame contains unicast data frame transmitted from any of the servers in the wide area network, for example, the server 50-2, or a PON configuration frame transmitted from the OLT 10. In this case, the downstream frame processing unit 213 removes the GEM header 71 from the GEM frame (Step 403), and determines the kind of the received frame contained in the GEM payload 72 (Step 404).

When the received frame is a PON configuration frame, the downstream frame processing unit 213 sends the received frame to the ONU controller 200 (Step 405) and subsequently reads out the next GEM frame from the downstream receive buffer 212 (Step 401).

When the received frame is a unicast data frame, the downstream frame processing unit 213 searches the internal routing table 240 for the line number 242 that corresponds to DMAC 631 indicated by the L2 header of the received frame, adds an internal header containing this line number to the received frame (Step 419), and sends the received frame to the downstream transmit controller 219 (Step 420). Then, the downstream frame processing unit 213 reads out the next GEM frame from the downstream receive buffer 212 (Step 401).

When a port ID contained in the GEM header 71 does not agree with the personalized port ID, the downstream frame processing unit 213 determines whether the port ID of the GEM header 71 is a multicast port ID (Step 410). If it is not the multicast port ID, the downstream frame processing unit 213 deletes the GEM frame (Step 421), and reads out the next GEM frame from the downstream receive buffer 212 in Step 401.

If the port ID of the GEM header 71 is the multicast port ID, that is, if the GEM frame contains a IP packet for multicast data or G-Query message, it is desirable to delete the received frame provided that the receives frame is not related to the user terminal under its control. Then, the downstream frame processing unit 213 searches the multicast group management table 260 for a table entry that corresponds to a destination IP address of the multicast data packet (IP multicast group address) or an IP multicast group address indicated by the G-Query message (Step 413).

If the search (Step 414) shows that a table entry having the IP multicast group address of the received message is unregistered in the multicast group management table 260, the downstream frame processing unit 213 deletes the received GEM frame (Step 421) and reads out the next GEM frame from the downstream receive buffer 212 in Step 401.

If a table entry corresponding to the received message is registered already in the multicast group management table 260, the downstream frame processing unit 213 removes the GEM header from the GEM frame (Step 415). If the received frame is for the G-Query message (Step 416), it re-sets the report flag 265 of the table entry (Step 417). Then, the downstream frame processing unit 213 searches the internal routing table 240, generates an internal header that should be added to the received frame (Step 419), sends the multicast frame with the internal header added thereto to the downstream transmit controller 219 (Step 420), and reads out the next GEM frame from the downstream receive buffer 212 (Step 401). A step 418 will be described later.

When receiving an Ethernet frame from the downstream frame processing unit 213, the downstream transmit controller 219 removes the internal header, and sends the received frame to a line interface 202 specified by the line number indicated by the internal header. If a number for multicast is set in the internal header of the multicast frame, a received frame is sent to all the line interfaces. In this case, since the multicast frame is also transmitted to lines other than the lines having user terminals that should receive this frame, it will be also distributed to user terminals that do not participate in the multicast group.

What is necessary in order to limit the sending destinations of the multicast frame to specific lines to which user terminals participating in the multicast group are connected is just to use the ARP table 250.

For example, the following steps may be adopted: As shown by a step boxed with broken lines in FIG. 12, the downstream frame processing unit 213 searches the ARP table 250 for a MAC address 252 according to the participant's IP address 262 searched from the multicast group management table 260 (Step 418), searches the internal routing table 240 for the line number 242 corresponding to the MAC address 252, and generates an internal header that should be added to the multicast frame (Step 419).

When two or more participants' IP addresses are registered in the multicast group management table 260, along with a correspondence with one IP multicast group address 261, the downstream frame processing unit 213 will search the internal routing table 240 for two or more line numbers, and generate the internal header containing these two or more line numbers. Thus, it becomes possible to make the downstream transmit controller 219 selectively send the received frame to a specific line interface 202 by limiting a line that becomes a multicast frame sending destination by the internal header. However, even in this case, if plural user terminals are connected to the line through which the multicast frame is being sent out via a customer router 30, there is the possibility that the multicast frame is sent to user terminals that are not request sources of the multicast frame.

In the case of a network configuration where user terminals and the router 40-1 communicate an Ethernet frame using the VLAN in order to enhance the security of communication, the use of VID enables the user terminals specified by the VID to receive the frame even in the case where the same frame is multicast to plural user connection lines.

FIG. 13 shows a flowchart of the deletion processing routine of a multicast table entry that the ONU controller 200 performs when a time limit is reached.

When the time limit 264 is over for any of the table entries in the multicast group management table 260, the ONU controller 200 generates a local message (S-Query message) for secession confirmation using a participant's IP address indicated by the table entry as a destination IP address (Step 501), and sends this in the downstream frame processing unit 213 (Step 502). The downstream frame processing unit 213 adds an internal header that indicates a line number corresponding to the participant's IP address specified by the ARP table 250 and the routing table 240 to the S-Query message, and sends it to the downstream transmit controller 219.

The ONU controller 200 waits a response message (Report) from a user terminal receiving the S-Query message (Step 503). If the Report message is not received within a predetermined time, the ONU controller deletes a table entry having passed a time limit from the multicast group management table 260 (Step 504). If the Report message is received from the user terminal within the predetermined time, the ONU controller re-sets the time limit 264 of the table entry to a value 255 seconds later than the current time (Step 505).

Although in the embodiment, the ONU controller 200 performs registration/deletion of the table entry of the multicast group management table 260 according to the multicast control message (IGMP message) received from the upstream frame processing unit 222, the upstream frame processing unit 222 may be configured to perform registration/deletion of the table entry independently.

Second Embodiment

Figure 14:
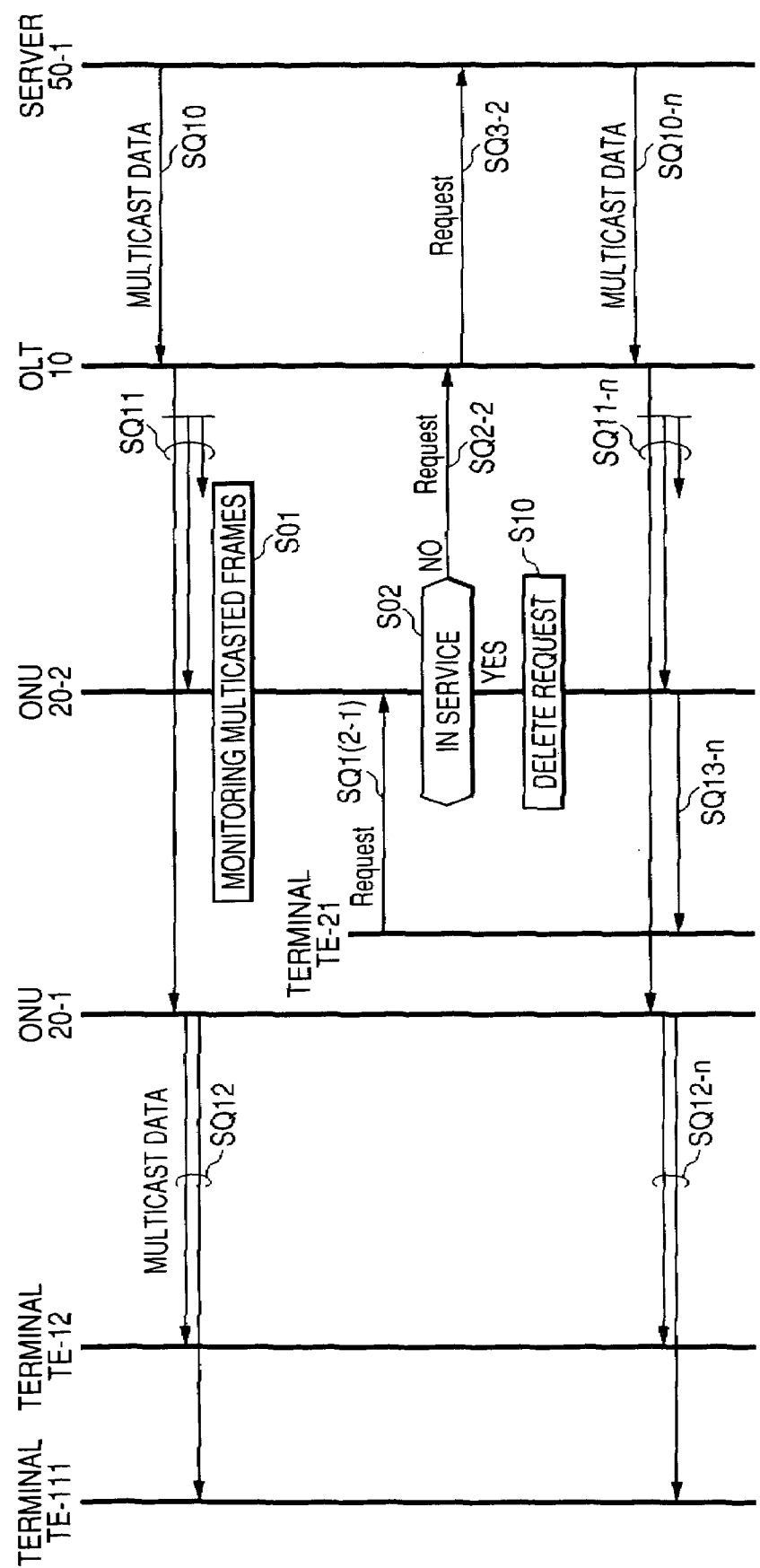
FIG. 14 is a sequence diagram showing a second embodiment of send control of the IGMP message and the multicast data according to an aspect of this invention.

FIG. 14 is a sequence diagram showing a second embodiment of send control of the IGMP message and the multicast data according to an aspect of this invention. Here, paying attention to the ONU 20-2, a feature of the second embodiment will be explained.

The feature of the second embodiment is in that, when multicast data that user terminals can view freely is being distributed in the PON section by a request from the ONU, each ONU is configured to be able to respond to a new request of participation in the multicast group from user terminals under its control and start a sending operation of the multicast data to the user terminal that is a request source without transmitting a Request to a server.

In the second embodiment, each ONU 20 controls sending of a request message of participation in the multicast group (Request message) to the OLT 10 by using the multicast monitoring table 230 shown in FIG. 9.

The multicast monitoring table 230 consists of plural table entries each showing an IP multicast group address 231 of a multicast program that user terminals can view freely without charge. Each table entry contains a time stamp 232 as service state information that indicates whether multicast data with the IP multicast group address 231 is being transmitted in the PON section. The ONU updates a time stump 232 to the current time each time receiving the multicast data.

FIG. 14 shows a state that the multicast data is being relayed for the user terminals TE-111 and TE-12 (SQ10 to SQ12).

Since the multicast data frame is broadcast to all the ONUs connected to the OLT 10, the ONU 20-2 can monitor a group IP address of the multicast data being broadcast in the PON section currently (S01). When the OLT 10 receives a multicast data frame sent to the PON section (SQ11), the ONU 20-2 collates an IP multicast group address indicated by the received frame with the multicast monitoring table 230. If a pertinent table entry exists, the ONU 20-2 updates its time stamp 232.

Here, it was assumed that the user terminal TE-21 connected to the ONU 20-2 issued the request message of participation in the multicast group (Request message) (SQ1(2-1)). In this embodiment, the ONU 20-2 received the Request message searches the multicast monitoring table 230 and determines whether data of the multicast program requested by the user terminal TE-21 is currently in a distribution service in the PON section from service state information (time stamp) 232 of a table entry that corresponds to the IP multicast group address indicated by the received message (S02).

Whether the multicast data of the object is being distributed currently can be determined by the presence of the pertinent table entry and by a fact that a value of the time stamp of the pertinent table entry is being updated every moment. When there is no objective table entry in the multicast monitoring table 230, or when a time stamp of the objective table entry shows an old time, the ONU 20-2 determines that the multicast data that is requested to be participated is not in a distribution service in the PON section and sends the Request message to the OLT 10 (SQ2-2). This message is sent to the server 50-1 by the OLT 10.

If the requested multicast data is in a distribution service in the PON section, the ONU 20-2 deletes the received Request message (S10) and relays the multicast data that the server 50-1 transmits after this (SQ10-n) and the OLT 10 broadcasts in the PON section (SQ11-n) to the user terminal TE-21 (SQ13-n).

Figure 15:
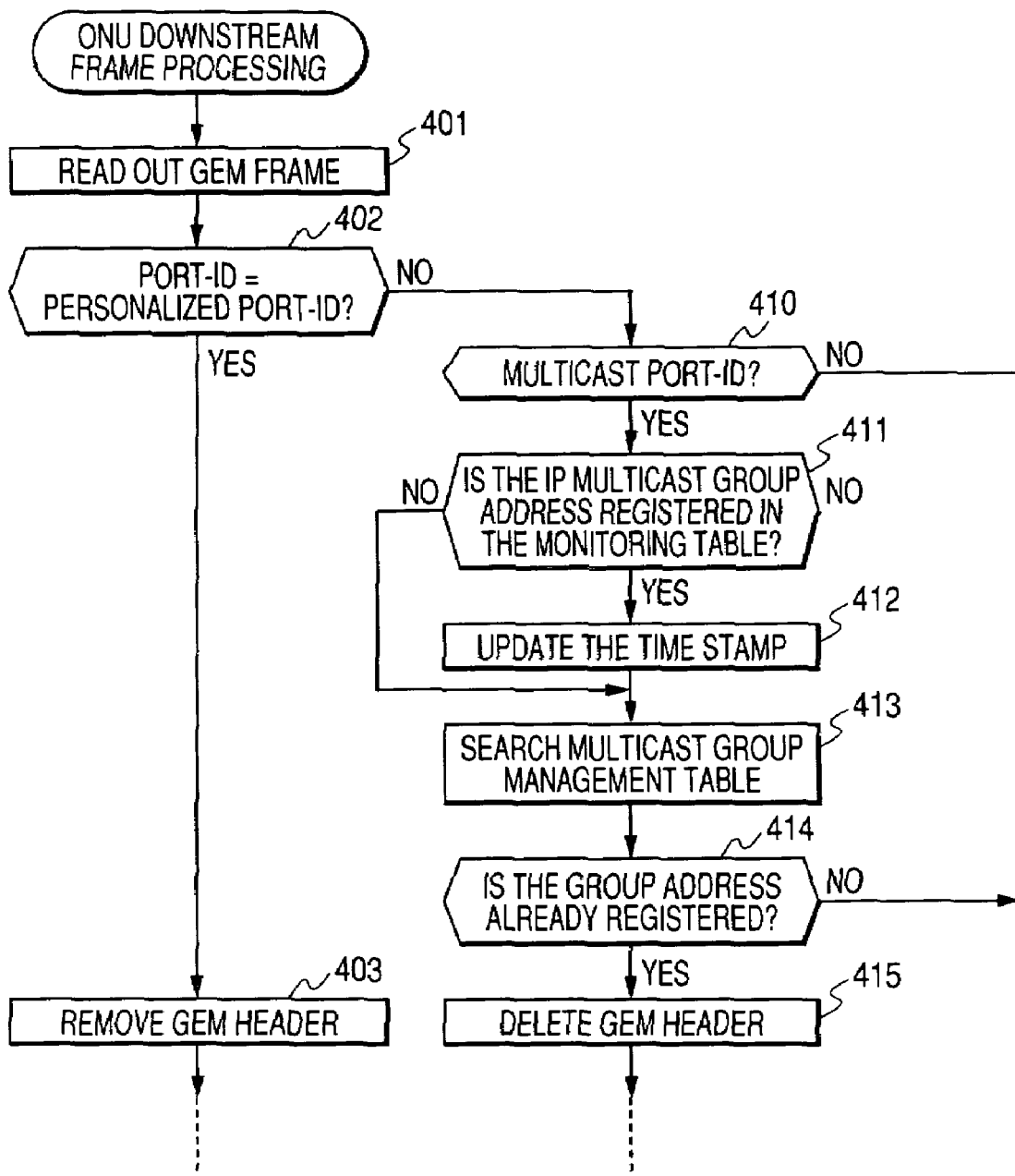
FIG. 15 is a flowchart showing an operation of the downstream frame processing unit 213 of the ONU in the second embodiment.

FIG. 15 is a flowchart showing an operation of the downstream frame processing unit 213 of the ONU 20 in the second embodiment. The same reference numerals are applied to steps common to the first embodiment explained in FIG. 12 and explanation will be omitted.

When a port ID of the received GEM frame is a multicast port ID (Step 410), the downstream frame processing unit 213 determines whether the IP multicast group address of the received frame is registered in the multicast monitoring table 230 (Step 411). If it is registered already, the downstream frame processing unit 213 updates a value of the time stamp 232 of a table entry corresponding to the IP multicast group address to the current time (Step 412), and searches the multicast group management table 260 (Step 413). A subsequent processing sequence is the same as that of FIG. 13.

Figure 16:
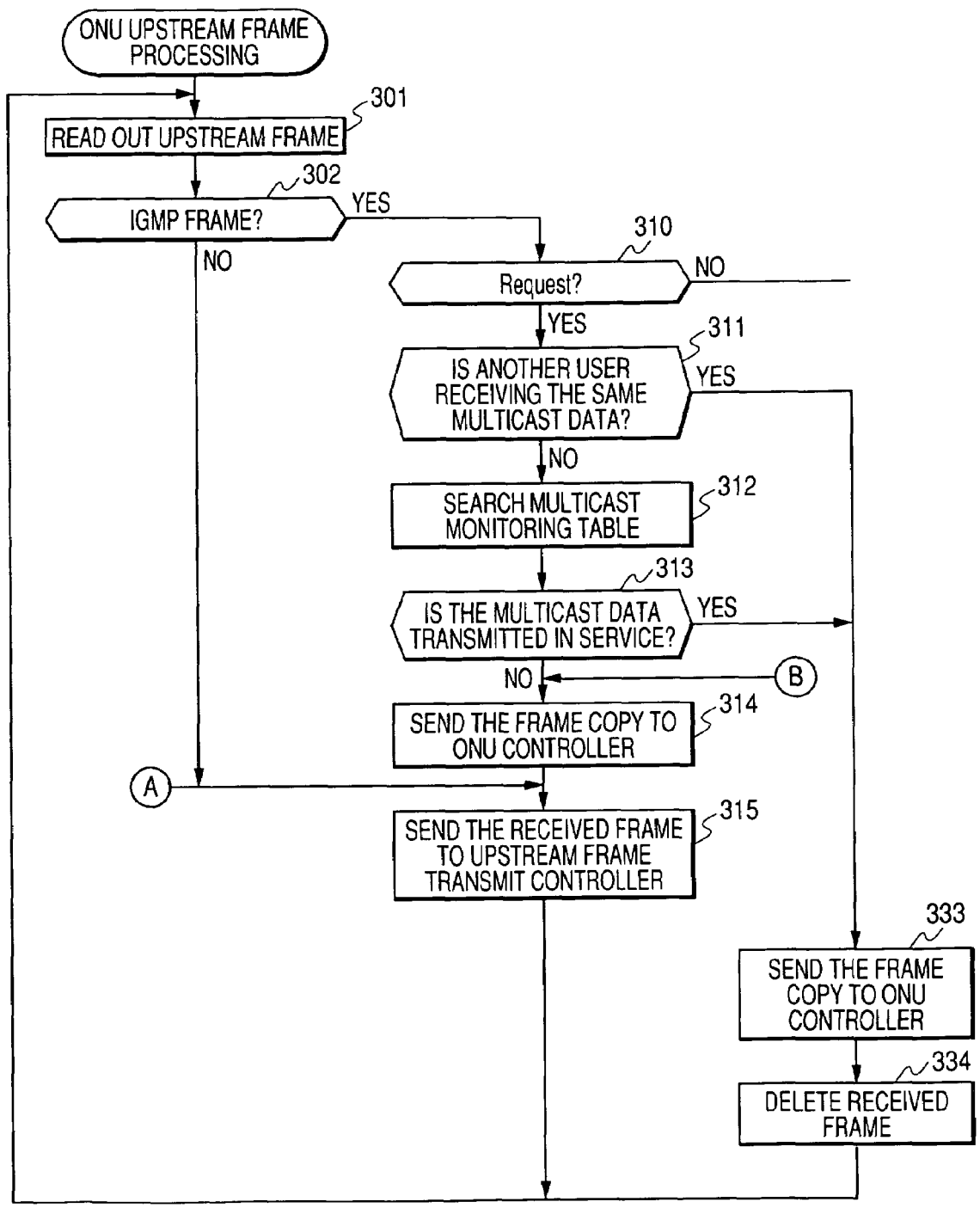
FIG. 16 is a flowchart showing an operation of the upstream frame processing unit 222 of the ONU in the second embodiment.

FIG. 16 is a flowchart showing an operation of the upstream frame processing unit 222 of the ONU 20 in the second embodiment. The same reference numerals are applied to steps common to the first embodiment explained in FIG. 11 and explanation will be omitted.

When the received frame is a Request message frame of the IGMP (Step 310), the upstream frame processing unit 222 searches the multicast group management table 260 and determines whether another participant's IP address 262 is registered already in the same multicast group as the IP multicast group address 625 indicated by the Request message (Step 311). When the participant's IP address 262 is unregistered, the upstream frame processing unit 222 checks the multicast monitoring table 230 (Step 312) and determines whether the multicast data requested by the received message is in a distribution service in the PON section from the presence of a table entry corresponding to the received message and a value of the time stamp (Step 313).

If the requested multicast data is in a distribution service, the upstream frame processing unit 222 sends a copy of the received frame (Request message) to the ONU controller 200 (Step 333), deletes the received frame (Step 334), and reads out the next upstream frame from the upstream receive buffer 221 (Step 301). Also in this case, the received frame itself may be sent to the ONU controller 200 in Step 333 instead of deleting the received frame.

If the requested multicast data is not in a distribution service, the upstream frame processing unit 222 sends a copy of the received frame (Request message) in the ONU controller 200 (Step 314), sends the received frame to the upstream transmit controller 223 (Step 315), and reads out the next upstream frame from the upstream receive buffer 221 (Step 301).

Third Embodiment

Figure 17:
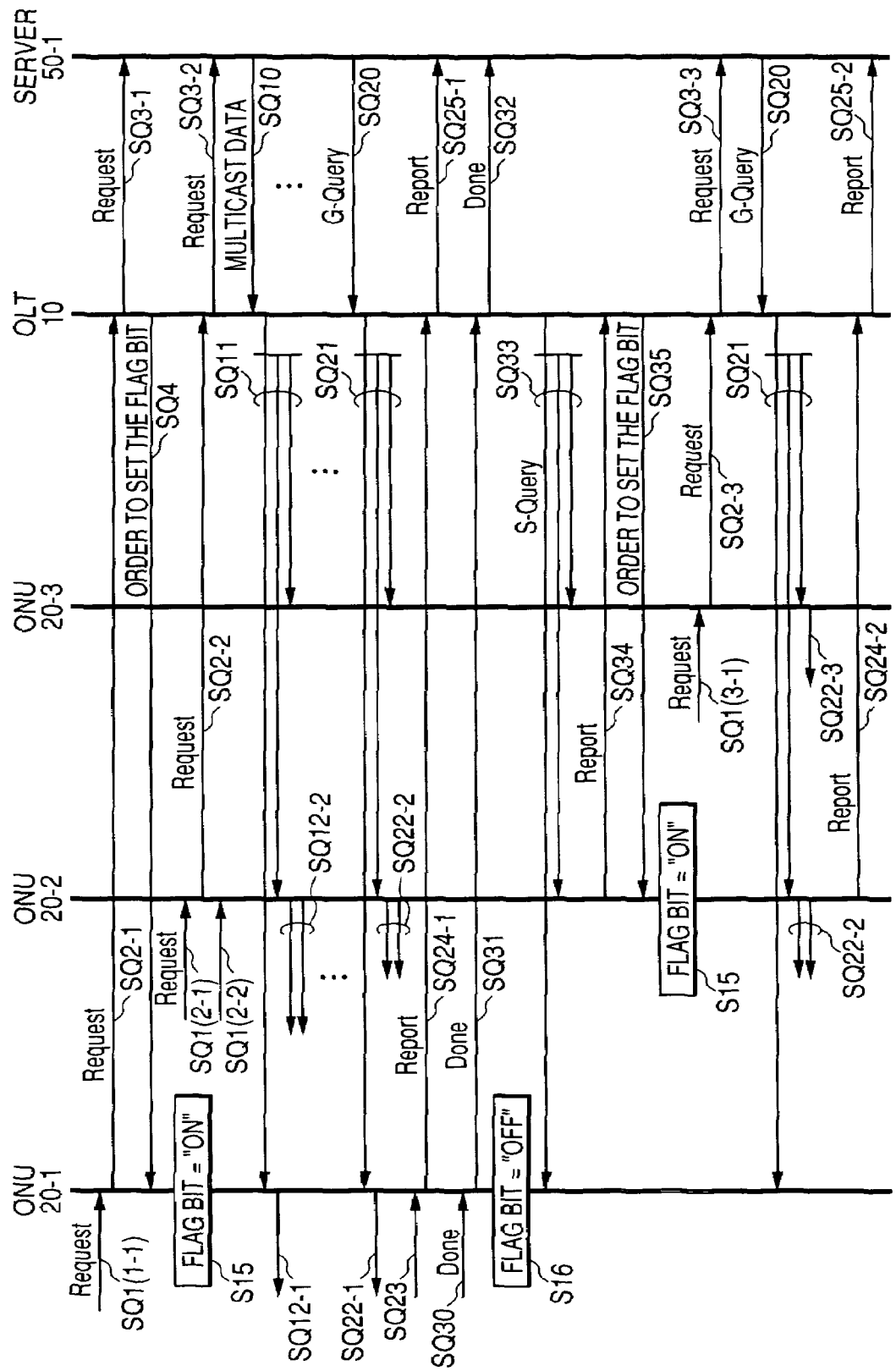
FIG. 17 is a sequence diagram showing a third embodiment of the IGMP message and the multicast data according to an aspect of this invention.

FIG. 17 is a sequence diagram showing a third embodiment of send control of the IGMP message and the multicast data according to an aspect of this invention.

As was explained in the sequence diagram of FIG. 10, the user terminal that wishes to continue reception of the multicast data needs to send back the Report message in response to the G-Query message for checking a reception state that was transmitted from the multicast server 50-1.

In the first embodiment, when each ONU 20 receives the Report message from the user terminal under its control, the each ONU 20 sends a first Report message to the OLT 10 and deletes the Report message of the same multicast group received after that, whereby the number of the Report messages sent out in the PON section is reduced. In this case, since the each ONU 20 connected to the OLT 10 transmits the Report message individually, the OLT 10 will receive the Report messages from plural ONUs in response to one G-query message, and relay them to the server 50-1.

If there exists at least one user terminal that wishes to continue reception of the multicast data, the server 50-1 needs to transmit the multicast data to the OLT 10, and the Report message from the OLT 10 does not need to be received any number of times. Therefore, what is necessary for the OLT 10 is just to receive the Report message responding to the G-query message only once from the PON section and send it back to the server, and the OLT 10 does not need to receive the Report messages from the plurality of ONUs individually.

The third embodiment has a feature in that the OLT 10 specifies beforehand an ONU having a response obligation to the G-Query message among plural ONUs 20 in each of which a multicast participant user exists, whereby redundant sending of the Request message in the PON section is eliminated and a load of the OLT is decreased.

In FIG. 17, a case is assumed where to the same multicast group, a participation request from the user terminal of the ONU 20-1 (SQ1 (1-1)) takes place first, and then participation requests from the user terminals of the ONU 20-2 (SQ1(2-1) and SQ1(2-2)) and a participation request from the user terminal of the ONU 20-3 (SQ1(3-1)) take place. Each ONU sends a first participation request message (Request) received from each user terminal to the OLT 10 (SQ2-1, SQ2-2, and SQ2-3).

In this embodiment, when the OLT 10 receives a first participation request to one multicast group, the OLT 10 sends this to the server 50-1 (SQ3-1) and subsequently transmits a flag setting instruction message that is intended to impose a response obligation to the G-Query message to the sender ONU 20-1 of the participation request. When the ONU 20-1 receives the flag setting instruction message, the ONU 20-1 sets a Report transmission flag bit (Bit) to an ON state (S15).

The Report transmission flag bit is a flag (a second flag) that is different from a Report flag 265 (a first flag) shown by the multicast group management table 260. In an initial state, for each of the ONUs 20-1 to 20-3, a Report transmission flag bit is set as an OFF state. When this flag bit is an off sate, it is not necessary to send the Report message received from the user terminal to the OLT 10.

In this state, when the server 50-1 transmits a G-Query (SQ20), the OLT 10 broadcasts this in the PON section (SQ21), and the ONUs 21-1 and 20-2 in which multicast participant users exist send the G-Query to the respective user terminals (SQ22-1, SQ22-2). The user terminal that wishes to continue reception of the multicast data sends back the Report message in response to the G-Query. In this embodiment, only the ONU 20-1 whose Report transmission flag represents the ON state sends a first Report message (SQ23) received from the user terminal to the OLT 10 (SQ24-1). The Report message is sent to the server 50-1 by the OLT 10 (SQ25-1).

Here, it is assumed that the user terminal connected to the ONU 20-1 issued a multicast secession request (Done) (SQ30). In this case, after the ONU 20-1 sends the Done message to the OLT 10 (SQ31), the ONU 20-1 switches the Report transmission flag bit to the OFF state (S16). When the OLT 10 receives the Done message from the ONU 20-1 that has given a flag setting instruction, the OLT 10 sends the Done message to the server 50-1 (SQ32) and subsequently broadcasts an S-Query message in the PON section (SQ33).

An ONU in which the user terminal participating in the multicast group exists among the ONUs that received the S-Query message (in the case shown here, the ONU 20-2) sends back the Report message (SQ34). If the participant user exists also in the ONU 20-3, the ONU 20-2 will send back the Report message. The OLT 10 transmits a flag setting instruction message to the ONU 20-2 that responded to the S-Query message first (SQ25)

When the ONU 20-2 receives the flag setting instruction message, it switches the Report transmission flag bit to the ON state (S15). After that, when the server 50-1 transmits a G-Query (SQ20), the OLT 10 broadcasts this in the PON section (SQ21), and the ONUs 21-2 and 20-3 send the G-Query to respective user terminals (SQ22-2, SQ22-3). If the user terminal that wishes to continue reception of the multicast data sends back the Report message in response to the G-Query (SQ23-2), the ONU 20-2 sends the Report message to the OLT 10 this time (SQ24-2). The Report message is sent to the server 50-1 by the OLT 10 (SQ25-2).

Fourth Embodiment

Figure 18:
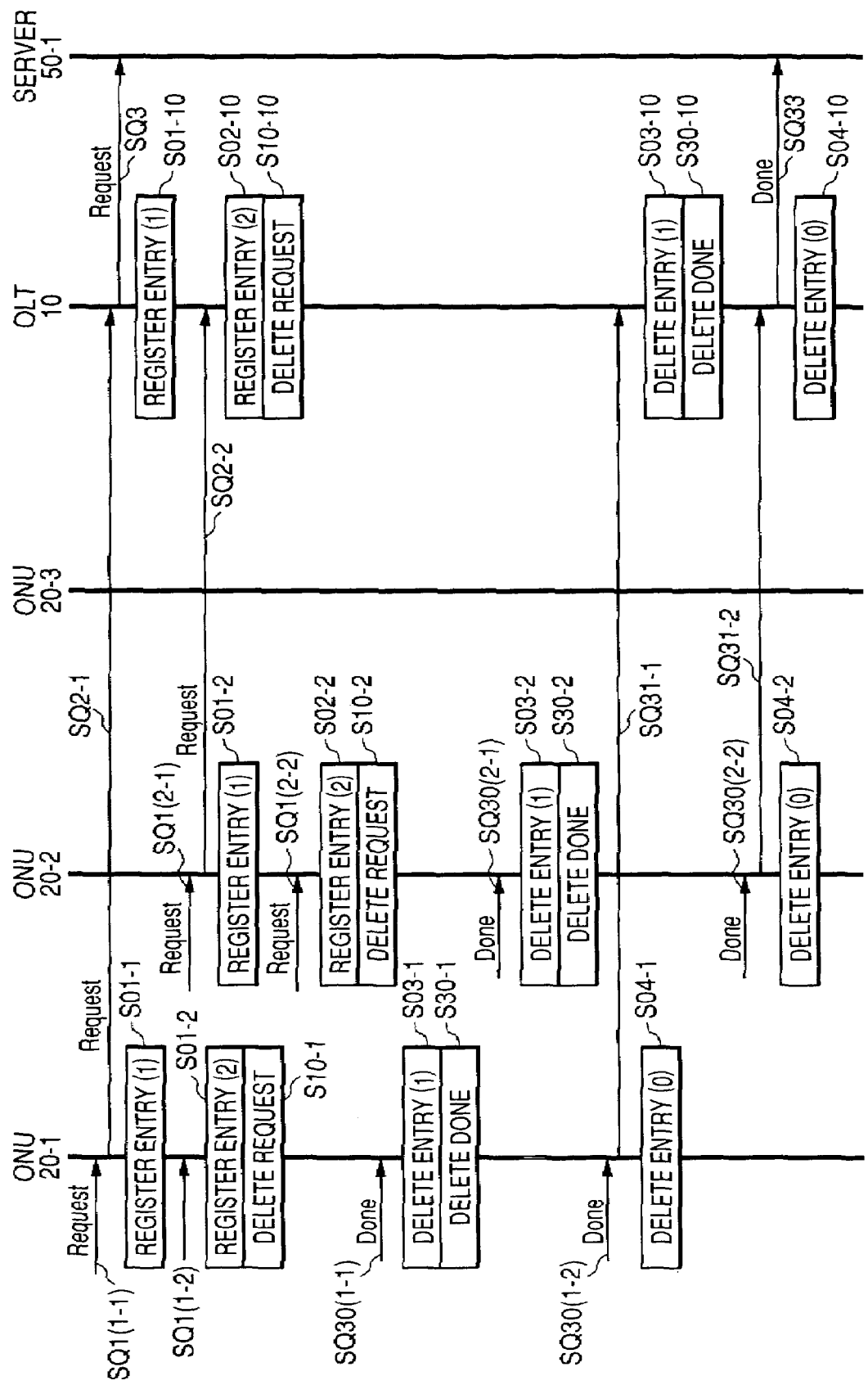
FIG. 18 is a sequence diagram showing a fourth embodiment of send control of the IGMP message and the multicast data according to an aspect of this invention.

FIG. 18 is a sequence diagram showing a fourth embodiment of send control of an IGMP message and multicast data according to an aspect of this invention.

The fourth embodiment is characterized in that the OLT 10 selectively deletes the IGMP message received from the ONU 20-1 to ONU 20-k, and sends necessary minimum IGMP messages to the server 50-1. In this embodiment, the OLT 10 is not provided with the management table for showing the relay necessity determination information of the control message (IGMP message), along with a correspondence with the multicast group identifier. The management table may be one that stores an IP address of a participant terminal for each multicast group, like the multicast group management table with which the each ONU 20 is provided.

When the ONU 20-1 receives the Request messages from user terminals (SQ1(1-1), SQ1(1-1)), the ONU 20-1 registers new table entries in the multicast group management table (S01-1, S02-1), sends only the Request message received first in each multicast group to the OLT 10 (SQ2-1), and deletes the Request message received after that (S10-1). When the ONU-1 receives the Done messages from user terminals (SQ30(1-1), SQ30(1-2)), the ONU 20-1 deletes table entries that correspond to the received messages from the multicast group management table (S03-1, S04-1), sends only the Done message received last in each multicast group to the OLT 10 (SQ31-1), and deletes the Done message received before that (S30-1).

Similarly with the ONU 20-1, when the ONU 20-2 receives the Request messages from user terminals (SQ1(2-1), SQ1(2-2)), the ONU 20-2 sends only the Request message received first in each multicast group to the OLT 10 (SQ2-2), and deletes the Request message received after that (S10-2). When the ONU 20-2 receives the Done messages (SQ30(2-1), SQ30(2-2)), the ONU 20-2 sends only the Done message received last in each multicast group to the OLT 10 (SQ31-2), and deletes the Done message received before that (S30-2).

When the OLT 10 of this embodiment receives the Request messages from the ONUs 20-1 and 20-2 (SQ2-1, SQ2-2), the OLT 10 registers new table entries in the management table (S01-10, S02-10), sends only the Request message received first in each multicast group to the server 50-1 (SQ3), and deletes the Request message received after that (S10-10). When the OLT 10 receives the Done message from the ONU (SQ31-1 and SQ31-2), the OLT 10 deletes a table entry corresponding to the received message from the multicast group management table (S03-10, S04-10), sends only the Done message received last in each multicast group to the OLT 10 (SQ33), and deletes the Done message received before that (S30-10).

Figure 19:
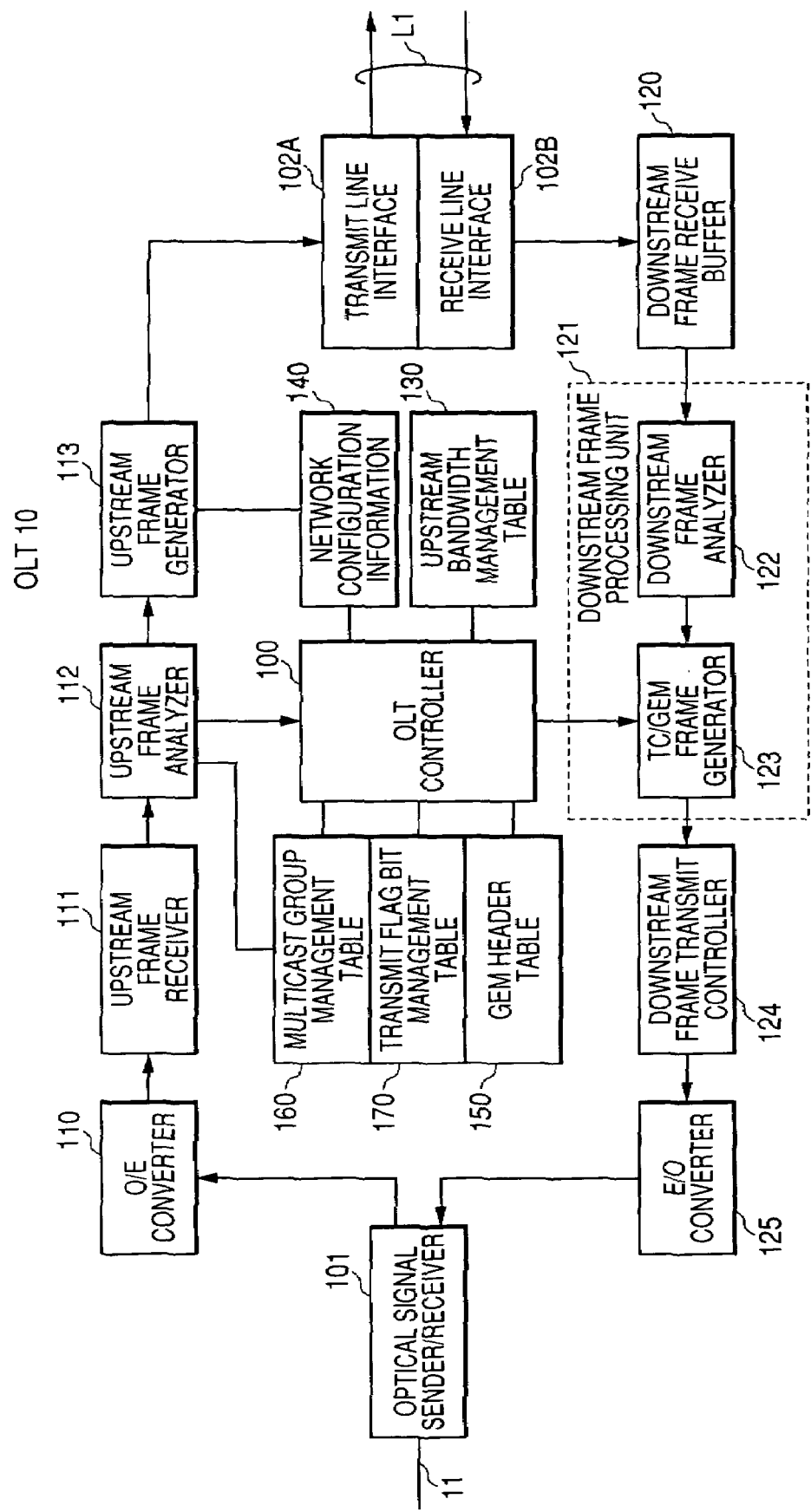
FIG. 19 is a block diagram showing one embodiment of the OLT 10 that realizes send control of the third and fourth embodiments.

FIG. 19 is a block diagram of the OLT 10 provided with functions of the third and fourth embodiments described above.

The OLT 10 consists of an OLT controller 100, an optical signal sender/receiver 101 connected with the optical fiber 11, a transmit line interface 102A and a receive line interface 102B both connected to the line L1, an upstream signal processing unit provided between the optical signal sender/receiver 101 and the transmit line interface 102A, and a downstream signal processing unit provided between the optical signal sender/receiver 101 and the receive line interface 102B.

The OLT controller 100 is provided with memory in which an upstream bandwidth management table 130, a network configuration information table 140, a GEM header table 150, a multicast group management table 160, and a transmit flag bit management table 170 are formed.

The upstream signal processing unit consists of an O/E converter 110 for converting an optical signal received by the optical signal sender/receiver 101 into an electric signal, an upstream frame receiver 111 for regenerating an upstream frame from the output signal of the O/E converter 110, an upstream frame analyzer 112 connected with the upstream frame receiver 111, and an upstream frame generator 113 for converting a frame sent from the upstream frame analyzer 112 into a format compatible with a protocol on the communication line L1.

The upstream frame analyzer 112 analyzes an upstream receive frame. If the receive frame is a configuration frame in the PON section, the upstream frame analyzer 112 sends this in the OLT controller 100; if the receive frame is a user frame or IGMP message frame that should be sent to the server 50-1 via the router 40-1, the upstream frame analyzer 112 sends this in the upstream frame generator 113. Similarly with the upstream frame generator 222 of the ONU described above, if the upstream receive frame is an IGMP message frame, the upstream frame analyzer 112 searches the multicast group management table 160, sends a frame copy to the OLT controller 100, and selectively deletes the received frame.

If a protocol on the communication line L1 is ATM, for example, the upstream frame generator 113 converts a received frame into an ATM cell, and sends it to the transmit line interface 102A. Information necessary for format conversion of a frame is read out from the network configuration information memory 140. In the case where a protocol on the communication line L1 is Ethernet and the upstream reception frame is also Ethernet, what the upstream frame generator 113 should do is just to send an Ethernet frame sent from the upstream frame analyzer 112, as it is, to the transmit line interface 102A.

The downstream signal processing unit consists of a receive buffer 120 for temporarily accumulating a downstream frame that the receive line interface 102B receives from the communication line L1, a downstream frame processing unit 121 for converting the downstream frame read from the receive buffer 120 into a frame format inherent to the PON section and sending it, a downstream transmit controller 124 connected to the frame processing unit 121, and an E/O converter 125 for converting a frame sent from the downstream transmit controller 124 into an optical signal and sending it to the optical signal sender/receiver 101.

The downstream frame analyzer 121 consists of a downstream frame analyzer 122 to analyze a downstream frame read from the receive buffer 120, and a TC/GEM frame generator 123 that converts a frame sent from the downstream analyzer 122 and a configuration frame supplied from the OLT controller 100 into GEM frames and sends them in a TC frame format (in this embodiment, a GTC frame).

The OLT controller 100 receives a configuration frame indicating an accumulation state or transmits data length of transmit data from each ONU-i, and controls a transmission time zone of an upstream frame that should be allocated to each ONU by the upstream bandwidth management table 130. A transmission time zone allocated to each ONU is informed to each ONU by a downstream configuration frame generated by the OLT controller 100.

The TC/GEM frame generator 123 searches the GEM header table 150, and converts a frame sent from the downstream frame analyzer 122 and a configuration frame supplied from the OLT controller 100 (for example, OMCI frame and PLOAM frame) into GEM frames.

The GEM header table 150 consists of plural table entries each showing a correspondence between the DMAC and the port ID that should be set in the GEM header. For example, in the table entry containing MAC addresses of the user terminals TE-111, TE-112 shown in FIG. 1 as DMACs, each port ID represents each port ID of the ONU 20-1; in the table entry containing a MAC address of the user terminal TE-21, a port ID represents a port ID of the ONU 20-2. Moreover, in the port entry including a MAC address for multicast as a DMAC, the port ID indicates a multicast port ID.

The TC/GEM frame generator 123 searches the GEM header table 150 for a GEM port ID corresponding to the DMAC 631 indicated by the L2 header of the received frame, adds the GEM header containing this GEM port ID to the received frame to convert the received frame into a GEM frame. These GEM frames are mapped in the payload of the GTC frame, which is sent to the downstream transmit controller 124.

FIG. 20 shows the transmission flag bit management table 170 that the OLT controller 100 uses in realizing the third embodiment.

The transmission flag bit management table 170 consists of plural table entries each showing a port ID 172 of a participant ONU and a transmission flag 173, along with a correspondence with each IP multicast group address 171. In the transmission flag bit management table 170, when the Request message is received from the OLT, a table entry corresponding to the received message is registered; when the Done message is received from the ONU, a table entry corresponding to the received message is deleted.

Since the OLT controller 100 allocates a transmission time zone for an upstream frame to each ONU according to the upstream bandwidth management table 130, when receiving an IGMP message (a copy) from the upstream frame analyzer 112, the OLT controller 100 can specify a sender ONU of the received message. Moreover, since an inherent port ID that should be set as destination information in the GEM header of each ONU, the OLT controller 100 can associate the IGMP message received from the upstream frame analyzer 112 with a participant ONU port ID.

When the OLT controller 100 receives the Request message from the upstream frame analyzer 112, the OLT controller 100 generates a new table entry indicating a correspondence between the IP multicast group address 171 indicated by the received message and the participant ONU port ID 172, and registers the transmission flag bit management table 170. At this time, a transmission flag of a new table entry is in the re-set state ("0"). When the OLT controller 100 receives the Done message from the upstream frame analyzer 112, the table entry is deleted from the transmission flag bit management table 170.

When the OLT controller 100 registers a new table entry in the transmission flag bit management table 170, the OLT controller 100 checks the presence of another table entry having the same IP multicast group address as this table entry. If it is determined that the table entry registered this time is a first table entry that has the IP multicast group address, the OLT controller 100 switches the transmission flag 173 to the set state ("1"), and issues a flag setting instruction message to the ONU specified by the participant ONU port ID 172.

When the OLT controller 100 deletes a table entry from the transmission flag bit management table 170, the OLT controller 100 waits for the Report message having the same IP multicast group address as this table entry to be received from the upstream frame analyzer 112, switches the transmission flag 173 of a table entry corresponding to the sender ONU of a first received Report message to the set state ("1"), and issues a flag setting instruction message to the ONU specified by the participant ONU port ID 172.

A multicast group management table 160 that the OLT controller 100 uses in realizing the fourth embodiment consists of plural tables each showing a correspondence between the IP multicast group address and the participant's IP address, like the multicast group management table 260 with which each ONU 20 shown in FIG. 2 is provided. In this case, there may be no VID, no time limit, and no report flag.

When the OLT controller 100 receives the Request message from the upstream frame analyzer 112, the OLT controller 100 generates a new table entry showing a correspondence between the IP multicast group address 171 indicated by the received message and a sender's IP address, and registers this entry in the multicast group management table 160. When the Done message is received from the upstream frame analyzer 112, a table element corresponding to the received message is deleted from the multicast group management table 160.

According to the third embodiment described above, since the number of times of transmission of the upstream IGMP message in the PON section can be reduced, the communication that effectively uses the upstream bandwidth can be attained. According to the fourth embodiment, since the number of times of transmission of the IGMP message transmitted to the server from the OLT 10 can be reduced, the communication that effectively uses the upstream bandwidth between the OLT 10 and the router can be attained.

Although the case where this invention was applied to the G-PON was explained as an embodiment in the foregoing, this invention is also applicable to the GE-PON. In this case, LLID (Logical Link ID) is applied to the header of the transmit frame in the PON section instead of the port ID.

What is claimed is:

1. An optical network unit that is connected to an optical line terminal (OLT) connected to a wide area network via an optical splitter and a first line connected to the optical splitter and selectively sends unicast data and multicast data received via an optical splitter and a first line connected to the optical splitter from the OLT to a user terminal, comprising:

a multicast monitor for receiving the multicast data sent from wide area network to the OLT according to the requirement of the other ONT connected to the OLT via the optical splitter and a second line connected to the optical splitter and sent from the OLT via the optical splitter and monitoring the distribution state of the multicast data without the requirement of the user; and a first table showing the distribution state of multicast data monitored with the multicast monitor corresponding to a multicast group identifier, wherein, when receiving a control message indicating a request of participation in the multicast group from any of the user terminals, the optical network unit determining whether multicast data of the multicast group specified by the control message is in service from the wide area network to the OLT according to the requirement of the other ONT based on the first table, and wherein, when the multicast data of the multicast group specified by the control message is already in service from the wide area network to the OLT, the optical network unit starting distribution of the multicast data received via the first line and being in service according to the requirement of the other ONT to the sender user terminal of the control message without sending the control message to the optical line terminal.

2. The optical network unit according to claim 1, connected to a plurality of user terminals, comprising:
- a second table for showing a correspondence between the multicast group identifier and the address of a user terminal of the plurality of user terminals participating in the multicast group;
- an upstream frame send controller that, when receiving a control message showing a request of participation in the multicast group from any of the user terminals, determines whether the control message needs to be sent to the optical line terminal according to the second table;
- a downstream frame send controller for controlling distribution of the multicast data received via the first line to the user terminal according to the second table
- wherein, when another user terminal address of the plurality of the user terminals is registered already, along with a correspondence with the multicast group identifier specified by the control message, in the multicast second table, the upstream frame send controller deletes the control message without sending it to the optical line terminal, and
- wherein, when another user terminal address of the plurality of the user terminals corresponding to the multicast group identifier specified by the control message is unregistered in the second table, the upstream frame send controller determines whether the control message needs to be sent to the optical line terminal according to the first table.

3. The optical network unit according to claim 2,
- wherein, when the upstream frame send controller receives a control message showing a request of secession from the multicast group from any of the user terminals, the correspondence between the multicast group identifier and the user terminal address indicated by the control message is deleted from the second table, and
- wherein, when another user terminal address of the plurality of the user terminals is registered already, along with a correspondence with the multicast group identifier specified by the control message, in the second table, the control message is deleted without being sent to the optical line terminal.

4. A network system in which a plurality of optical network units (ONUs) each accommodating a plurality of user terminals and an optical line terminal (OLT) connected to a wide area network are connected via an optical splitter, the optical line terminal sends a downstream frame received from the wide area network to the plurality of optical network units via the optical splitter and each of the optical network units selectively sends unicast data and multicast data received as the downstream frame to the user terminals,
- each of the optical network units is connected to the optical splitter via a line,
- the each optical network unit having:
- a multicast monitor for receiving the multicast data sent from wide area network to the OLT according to the requirement of the other ONT connected to the OLT and sent from the OLT via the optical splitter and monitoring the distribution state of the multicast data without the requirement of the user terminal accommodated to the ONU; and
- a first cable showing the distribution state of multicast data monitored with the multicast monitor corresponding to a multicast group identifier;
- wherein, when receiving a control message indicating a request of participation in the multicast group from any of the user terminals, the optical network unit determining whether multicast data of the multicast group specified by the control message is in service from the wide area network to the OLT according to the requirement of the other ONT based on the first table, and
- wherein, when the multicast data of the multicast group specified by the control message is already in service from the wide area network to the OLT, the optical network unit starting distribution of the multicast data received via the line and being in service according to the requirement of the other ONT to the sender user terminal of the control message without sending the control message to the optical line terminal.

5. The network system according to claim 4, each optical network units connected to a plurality of user terminals, comprising:
- a second table for showing a correspondence between the multicast group identifier and the address of a user terminal of the plurality of user terminals participating in the multicast group;
- an upstream frame send controller that, when receiving a control message showing a request of participation in the multicast group from any of the user terminals, determines whether the control message needs to be sent to the optical line terminal according to the second table; and
- a downstream frame send controller for controlling distribution of the multicast data received via the line to the user terminal according to the second table
- wherein when another user terminal address of the plurality of the user terminals is registered already, along with a correspondence with the multicast group identifier specified by the control message, in the multicast second table, the upstream frame send controller deletes the control message without sending it to the optical line terminal, and
- wherein, when another user terminal address of the plurality of the user terminals corresponding to the multicast group identifier specified by the control message is unregistered in the second table, the upstream frame send controller determines whether the control message needs to be sent to the optical line terminal according to the first table.

6. The optical network unit according to claim 5,
- wherein, when the upstream frame send controller receives a control message showing a request of secession from the multicast group from any of the user terminals, the correspondence between the multicast group identifier and the user terminal address indicated by the control message is deleted from the second table, and
- wherein, when another user terminal address of the plurality of the user terminals is registered already, along with a correspondence with the multicast group identifier specified by the control message, in the second table, the control message is deleted without being sent to the optical line terminal.

* * * * *